US012579369B2

(12) United States Patent　　　　　(10) Patent No.:　US 12,579,369 B2
Sun et al.　　　　　　　　　　　　　　(45) Date of Patent:　　Mar. 17, 2026

(54) DATA MERGING USING MACHINE LEARNING

(71) Applicant: PwC Product Sales LLC, New York, NY (US)

(72) Inventors: Haoli Sun, Suzhou City (CN); Lu Dou, Shanghai (CN); Winnie Cheng, West New York, NJ (US)

(73) Assignee: PwC Product Sales LLC, New York, NY (US)

( * ) Notice: Subject to any disclaimer, the term of this patent is extended or adjusted under 35 U.S.C. 154(b) by 162 days.

(21) Appl. No.: 18/635,712

(22) Filed: Apr. 15, 2024

(65) Prior Publication Data

US 2025/0322170 A1　　　Oct. 16, 2025

(51) Int. Cl.
*G06F 40/30*　　　　(2020.01)
*G06F 40/35*　　　　(2020.01)

(52) U.S. Cl.
CPC .............. *G06F 40/30* (2020.01); *G06F 40/35* (2020.01)

(58) Field of Classification Search
CPC ......... G06F 40/30; G06F 40/35; G06F 40/242
USPC .......................................................... 704/9
See application file for complete search history.

(56) References Cited

U.S. PATENT DOCUMENTS

| | | | | |
|---|---|---|---|---|
| 7,092,567 | B2 * | 8/2006 | Ma ....................... | G06V 30/268 |
| | | | | 382/229 |
| 10,572,605 | B2 * | 2/2020 | Han ....................... | G06F 40/56 |
| 11,625,535 | B1 * | 4/2023 | Hore ....................... | G06F 18/22 |
| | | | | 704/9 |
| 12,282,897 | B1 * | 4/2025 | Kumar ..................... | G06N 5/02 |
| 2014/0006012 | A1 * | 1/2014 | Zhou ................... | G06F 16/3344 |
| | | | | 704/9 |
| 2022/0188974 | A1 * | 6/2022 | Mysore .................. | G06N 3/082 |

* cited by examiner

*Primary Examiner* — Justin W Rider
(74) *Attorney, Agent, or Firm* — Morrison & Foerster LLP

(57)　　　　　　　　ABSTRACT

An exemplary system for determining whether data sets can be merged together may receive first data labeled with a first variable and second data labeled with a second variable, wherein the first variable represents a first sequence of words and the second variable represents a second sequence of words. One or more machine learning models may generate one or more first candidate words and one or more second candidate words respectively based on the first and second variables. One or more generative machine learning models may generate a predicted first sequence of words and second sequence of words respectively based on the one or more first candidate words and one or more second candidate words. Based on a similarity metric determined based on the predicted sequences and a merging condition, the system may generate a merging instruction indicating whether the first data and the second data are to be merged.

20 Claims, 16 Drawing Sheets

First Dataset 500

| Person_ID | FAM_SIZE | AGE |
|-----------|----------|-----|
| 1 | 2 | 2 |
| 2 | 3 | 10 |
| 3 | 3 | 12 |
| 4 | 6 | 24 |
| 5 | 4 | 31 |
| 6 | 3 | 26 |
| 7 | 2 | 44 |
| 8 | 6 | 45 |
| 9 | 2 | 61 |
| ... | ... | ... |
| 10000 | 5 | 70 |

| State_ID | POP_0_4 | POP_5_9 | FAM_2PERS | FAM_3PERS |
|----------|---------|---------|-----------|-----------|
| 1 | 0.21 | ... | 0.11 | ... |
| 2 | 0.11 | ... | 0.21 | ... |
| 3 | 0.12 | ... | 0.14 | ... |
| 4 | 0.32 | ... | 0.22 | ... |
| 5 | 0.12 | ... | 0.13 | ... |
| 6 | 0.22 | ... | 0.12 | ... |
| 7 | 0.14 | ... | 0.14 | ... |
| 8 | 0.13 | ... | 0.15 | ... |
| 9 | 0.23 | ... | 0.22 | ... |
| ... | ... | ... | ... | ... |
| 56 | 0.22 | ... | 0.12 | ... |

Second Dataset 510

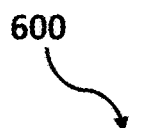

```
┌─ ─ ─ ─ ─ ─ ─ ─ ─ ─ ─ ─ ─ ─ ─ ─ ─ ┐   ┌─ ─ ─ ─ ─ ─ ─ ─ ─ ─ ─ ─ ─ ─ ─ ─ ─ ┐
│ Predicted Sequences of Words 412a │   │ Predicted Sequences of Words 412b │
│  ┌──────────┐     ┌──────────┐   │   │  ┌──────────┐     ┌──────────┐   │
│  │ Predicted│     │ Predicted│   │   │  │ Predicted│     │ Predicted│   │
│  │Sequence of│ ... │Sequence of│  │   │  │Sequence of│ ... │Sequence of│  │
│  │  Words   │     │  Words   │   │   │  │  Words   │     │  Words   │   │
│  │  412a-1  │     │  412a-n  │   │   │  │  412b-1  │     │  412b-m  │   │
│  └──────────┘     └──────────┘   │   │  └──────────┘     └──────────┘   │
└─ ─ ─ ─ ─ ─ ─ ─ ─ ─ ─ ─ ─ ─ ─ ─ ─ ┘   └─ ─ ─ ─ ─ ─ ─ ─ ─ ─ ─ ─ ─ ─ ─ ─ ─ ┘
```

Similarity
Metric
610

First Data
402a

Label
404a

Merging
Instruction
612

Second Data
402b

Label
404b

Merged Data
620

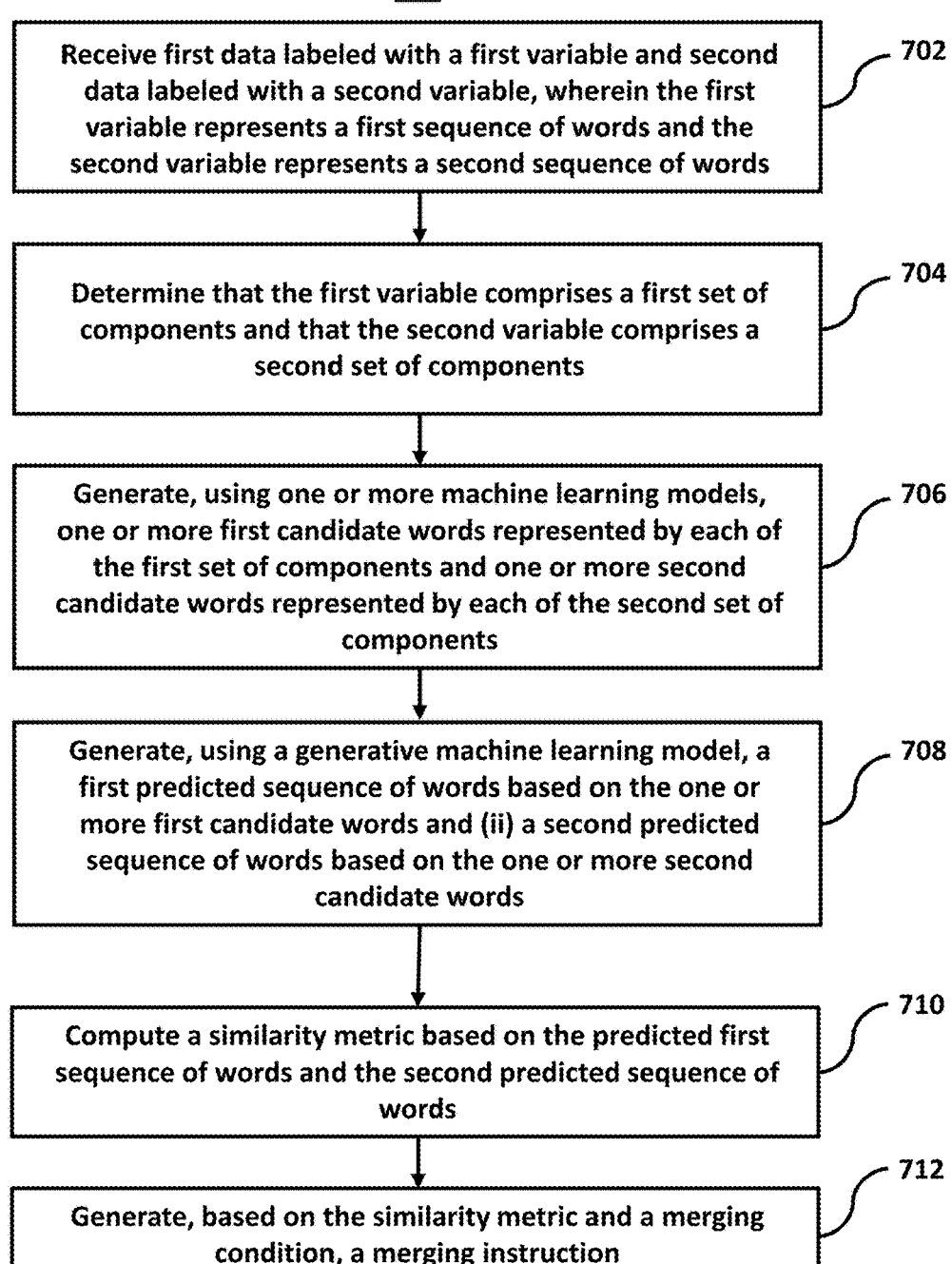

Receive first data labeled with a first variable and second data labeled with a second variable, wherein the first variable represents a first sequence of words and the second variable represents a second sequence of words ⟋ 702

Determine that the first variable comprises a first set of components and that the second variable comprises a second set of components ⟋ 704

Generate, using one or more machine learning models, one or more first candidate words represented by each of the first set of components and one or more second candidate words represented by each of the second set of components ⟋ 706

Generate, using a generative machine learning model, a first predicted sequence of words based on the one or more first candidate words and (ii) a second predicted sequence of words based on the one or more second candidate words ⟋ 708

Compute a similarity metric based on the predicted first sequence of words and the second predicted sequence of words ⟋ 710

Generate, based on the similarity metric and a merging condition, a merging instruction ⟋ 712

FIG. 7

DATA MERGING USING MACHINE LEARNING

FIELD

This application relates generally to machine learning models for determining whether differently labeled data can be merged.

BACKGROUND

Many data science tasks require data from two or more different data sets to be merged together. However, different data sets may be labeled using different variables. In some cases, data dictionaries, mapping the variables to sequences of words describing contextual information associated with the data's meaning, may be provided with the to-be-merged data sets. However, this is not always the case. Even so, many times the data dictionaries that are provided can be unhelpful or generate more problems. Furthermore, given the volume of data included within these data sets (e.g., often 2,000 or more columns), it can be impractical for data scientists to manually determine which data sets can be merged and which ones cannot.

An obvious approach to expanding variables labeling the data sets can include identifying any abbreviations/acronyms within the variable. However, this approach can be unreliable, particularly when the abbreviations are complex. As used herein, a complex abbreviation may be an abbreviation that includes different abbreviated components (e.g., XXX_YYY_ZZZ), where each component is an abbreviation of a word. One reason is that the rules for forming abbreviations of sentences and/or phrases can be flexible. This flexibility makes it difficult for a model to learn the rules and predict the expansions.

Thus, there is a need for techniques to determine whether data sets including different labels can be merged using machine learning models trained to handle complex abbreviations.

SUMMARY

Described herein are systems, methods, devices, and non-transitory computer readable storage media for determining whether differently labeled data sets can be merged together using machine learning models. The data sets may be labeled with variables that can be expanded to contextually relevant sequences of words (e.g., phrases). A similarity metric may be computed indicating how similar the contextually relevant sequences of words are to one another. Data sets labeled with variables representing contextually similar sequences of words may be merged together. The techniques described herein are particularly useful when the data set labels are complex and/or when the volume of data to be migrated is large. The technical solutions described herein allow for these complex labels to be compared in a more efficient, accurate, and unbiased manner than if performed manually. Furthermore, the technical solutions also address a common technical problem encountered during data processing and analytics tasks—the lack, or ineffectiveness, of a data dictionary. Using the disclosed machine learning models, trained to handle multiple types of labels (e.g., abbreviations, acronyms, etc.) having one or more components (e.g., portions of a label separated by a delimiter), regardless of complexity, contextually similar data included within different datasets can be identified quickly, decreasing data migration and analytic times, improving data acquisition quality, and removing unconscious biases in the similarity comparisons.

In some embodiments, a method for generating a merging instruction indicating whether to merge different data sets or portions thereof comprises: receiving first data labeled with a first variable and second data labeled with a second variable, wherein the first variable represents a first sequence of words and the second variable represents a second sequence of words; identifying one or more first components of the first variable and one or more second components of the second variable; for each of the one or more first components: generating, using one or more machine learning models, one or more first candidate words; for each of the one or more second components: generating, using the one or more machine learning models, one or more second candidate words; generating, using a generative machine learning model, a first prediction of the first sequence of words based on the one or more first candidate words and a second prediction of the second sequence of words based on the one or more second candidate words; computing a similarity metric based on the first prediction and the second prediction; and generating, based on the similarity metric and a merging condition, a merging instruction indicating whether the first data and the second data are to be merged.

In some embodiments, generating the merging instruction comprises: determining that the similarity metric satisfies the merging condition, wherein the merging instruction comprises an instruction to merge at least a portion of the first data and at least a portion of the second data.

In some embodiments, generating the merging instruction comprises: determining that the similarity metric fails to satisfy the merging condition, wherein the merging instruction comprises an instruction to prevent the first data and the second data from being merged.

In some embodiments, the merging condition being satisfied comprises the similarity metric being greater than or equal to a threshold similarity score.

In some embodiments, the method comprises: detecting one or more delimiters within at least one of the first variable or the second variable, wherein the one or more first components of the first variable and the one or more second components of the second variable are identified based on the one or more detected delimiters.

In some embodiments, the method comprises: generating, using the generative machine learning model, one or more first sequences of candidate words based on the one or more first candidate words, wherein the first prediction of the first sequence of words is selected from the one or more first sequences of candidate words; generating, using the generative machine learning model, one or more second sequences of candidate words based on the one or more second candidate words, wherein the second prediction of the second sequence of words is selected from the one or more second sequences of candidate words.

In some embodiments, generating the first prediction of the first sequence of words and the second prediction of the second sequence of words: for each of the one or more first sequences of candidate words: determining a first frequency with which the first sequence of candidate words occurs within a sentence table, wherein the first prediction of the first sequence of words is selected from the one or more first sequences of candidate words based on the first frequency; and for each of the one or more second sequences of candidate words: determining a second frequency with which the second sequence of candidate words occurs within the sentence table, wherein the second prediction of the second sequence of words is selected from the one or more second sequences of candidate words based on the second frequency.

In some embodiments, the sentence table stores a plurality of sentences from one or more domain-specific corpuses sorted based on a frequency with which each of the plurality of sentences occurs within the one or more domain-specific corpuses, wherein each of the plurality of sentences comprises a sequence of words.

In some embodiments, the method comprises: receiving a first selection of the first prediction of the first sequence of words from the one or more first sequences of candidate words; and receiving a second selection of the second prediction of the second sequence of words from the one or more second sequences of candidate words.

In some embodiments, the one or more machine learning models comprise: a first machine learning model trained to predict a word based on an n-gram of the word; a second machine learning model trained to predict a word based on a vowelless abbreviation of the word; and a third machine learning model trained to predict a sequence of words based on an acronym representing the sequence of words.

In some embodiments, the method comprises: training the first machine learning model by: selecting a plurality of words from a corpus; for each of the plurality of words: generating an n-gram of the word; inputting the n-gram into the first machine learning model to obtain a prediction of the word; computing a loss function based on a difference between the word and the prediction of the word; and adjusting one or more parameters of the first machine learning model based on the computed loss function.

In some embodiments, a size of the n-gram selected for each word of the plurality of words is based on a number of characters in the word.

In some embodiments, the n-gram is: a bi-gram for words having 3 characters; a 3-gram for words having 4 or more characters; or a 4-gram for words having 5 or more characters.

In some embodiments, the method comprises: training the second machine learning model by: selecting a plurality of words from a corpus; for each of the plurality of words: generating a vowelless abbreviation of the word; inputting the vowelless abbreviation of the word into the second machine learning model to obtain a prediction of the word; computing a loss function based on a difference between the word and the prediction of the word; and adjusting one or more parameters of the second machine learning model based on the computed loss function.

In some embodiments, the method comprises: generating a word table comprising a predefined listing of nouns and a plurality of domain specific words; generating a sentence table comprising a plurality of sentences from one or more domain-specific corpuses; and generating a mapping table comprising at least one of: (i) n-gram word mappings between words and n-grams of those words, (ii) vowelless abbreviation-word mappings between words and vowelless abbreviations of those words, or (iii) acronym-sequence mappings between sequences of words and acronyms representing those sequences of words.

In some embodiments, the method comprises: updating, based on the similarity metric satisfying the merging condition, the mapping table to include at least one of a new n-gram-word mapping, a new vowelless abbreviation-word mapping, or a new acronym-sequence mapping.

In some embodiments, the method comprises: training the generative machine learning model by: receiving a plurality of sets of words and a corresponding sequence of words formed from each set of words of the plurality of sets of words; and for each of the plurality of sets of words: inputting the set of words to the generative machine learning model to obtain a prediction of the corresponding sequence of words; computing a loss function based on the corresponding sequence of words and the prediction of the corresponding sequence of words; and adjusting one or more parameters of the generative machine learning model based on the loss function.

An exemplary system for generating a merging instruction indicating whether to merge different data sets or portions thereof comprises one or more processors and a memory, the memory storing one or more computer instructions which when executed by the one or more processors, cause the system to: receive first data labeled with a first variable and second data labeled with a second variable, wherein the first variable represents a first sequence of words and the second variable represents a second sequence of words; identify one or more first components of the first variable and one or more second components of the second variable; for each of the one or more first components: generate, using one or more machine learning models, one or more first candidate words; for each of the one or more second components: generate, using the one or more machine learning models, one or more second candidate words; generate, using a generative machine learning model, a first prediction of the first sequence of words based on the one or more first candidate words and a second prediction of the second sequence of words based on the one or more second candidate words; compute a similarity metric based on the first prediction and the second prediction; and generate, based on the similarity metric and a merging condition, a merging instruction indicating whether the first data and the second data are to be merged.

An exemplary non-transitory computer readable storage medium stores instructions for generating a merging instruction indicating whether to merge different data sets or portions thereof, wherein the instructions are executable by a system comprising one or more processors to cause the system to: receive first data labeled with a first variable and second data labeled with a second variable, wherein the first variable represents a first sequence of words and the second variable represents a second sequence of words; identify one or more first components of the first variable and one or more second components of the second variable; for each of the one or more first components: generate, using one or more machine learning models, one or more first candidate words; for each of the one or more second components: generate, using the one or more machine learning models, one or more second candidate words; generate, using a generative machine learning model, a first prediction of the first sequence of words based on the one or more first candidate words and a second prediction of the second sequence of words based on the one or more second candidate words; compute a similarity metric based on the first prediction and the second prediction; and generate, based on the similarity metric and a merging condition, a merging instruction indicating whether the first data and the second data are to be merged.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed can be resorted to by those skilled in the art, and that such modifications and variations are considered to be within the scope of this invention as defined by the appended claims.

BRIEF DESCRIPTION OF THE FIGURES

FIGS. 5A-5B illustrate examples of the various stages of the sequence of words prediction process, in accordance with various embodiments.

FIGS. 6A-6B illustrates an example of a process for generating a merging instruction based on predicted sequences of words, in accordance with various embodiments.

FIG. 7 illustrates a flowchart of an example method for generating a merging instruction indicating whether to merge different data sets or portions thereof, in accordance with various embodiments.

DETAILED DESCRIPTION

Figure 1:
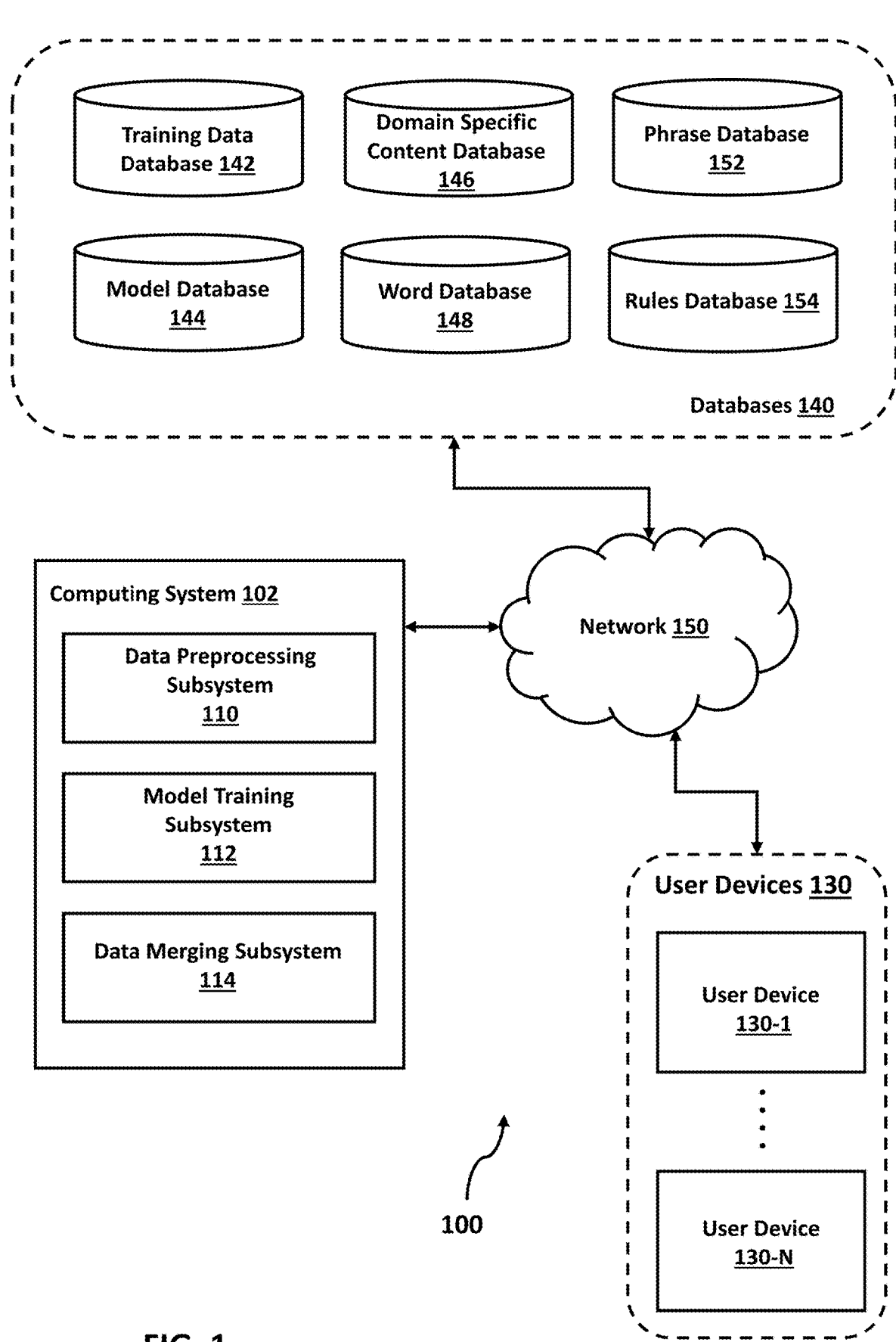
FIG. 1 illustrates an example system for generating a merging instruction indicating whether differently labeled data sets can be merged together, in accordance with various embodiments.

Described herein are systems, methods, and programming for determining whether differently labeled data sets can be merged together using machine learning models. Various data processing tasks, such as migration and analytics, require determining whether two or more different data sets can be joined together, and drawing conclusions and/or providing insights regarding those data sets. Oftentimes, the data may be labeled (e.g., column names) using variables (e.g., abbreviations, acronyms). However, technical problems arise when the variables increase in complexity. These situations make it difficult to know whether the underlying data is the same by simply trying to compare the variables. While data dictionaries may exist storing abbreviation-to-word mapping, they are not always available, comprehensive, reliable, or useful. Furthermore, the data dictionaries can be time consuming to parse to identify mappings to be used. Still further, the lack of domain-specific knowledge within the data dictionaries can increase the time needed to analyze the data for similarities.

The techniques described herein recast the data merging problem as a matching problem of abbreviated variables. In some embodiments, abbreviation expansion may be performed based on observed rules, one or more natural language processing (NLP) models, or using other steps. The expanded abbreviations—sequences of words—can be efficiently compared to determine how similar the different data sets are to each other. In some embodiments, domain-specific abbreviations may be matched by determining which abbreviations' sequences of words have similar domain-specific meanings. Furthermore, the techniques described herein can even be used for scenarios where data dictionaries are unavailable. The NLP models can be continually tuned and updated to learn new mappings, expanding its ability to handle more and more variables of various complexities.

The described techniques include multiple stages: a pre-processing stage, an expansion stage, and a similarity calculation stage. During the preprocessing stage, multiple tables may be built. In one or more examples, the tables may include (i) a word table or "full word" table storing common English nouns (e.g., about 5,000 nouns) and domain specific words, (ii) a sequence of words table or "sentence" table storing sequences of words (e.g., sentences, phrases) from domain specific corpus, and (iii) a mapping table storing n-gram-word mappings, vowelless abbreviation-word mappings, and acronym-sequence mappings. The various tables may be used to generate training data for training one or more machine learning models.

Also, during the preprocessing stage, multiple machine learning models may be trained. In one or more examples, a first machine learning model may be trained (e.g., using supervised learning) to predict an original word based on n beginning letters of the word (e.g., an n-gram of the word). Words may be selected from a corpus and used as labeled data. A beginning n letters may be selected for each word, with different length words having different length n-grams (for example, a bi-gram when the word's length is 3 characters, a 3-gram when the word's length is 4 characters, and a 3-gram and/or a 4-gram when the word's length is 5 or more characters). A second machine learning model may be trained to predict an original word based on a vowelless abbreviation of that word. Words may be selected from a corpus and used as labeled data. For each word, vowels included therein may be omitted to generate the features to be input to the second machine learning model during training. A third machine learning model may be trained to predict a sequence of words (e.g., a phrase) based on an acronym of that sequence of words. Sequences of words may be selected from a corpus of sequences of words or a domain specific corpus of content and used as labeled data. Acronyms of those sequences of words may be generated and input to the third machine learning model during training. In one or more examples, a generative machine learning model may be trained to generate a meaningful language sequence of words (e.g., sentence or phrase) using one or more words.

During the expansion stage, a variable used to label data from a data set may be separated into components. For example, delimiters within the variable may be detected, and the components may be separated based on the detected delimiters. The components can then be used to predict candidate words using the first machine learning model and/or the second machine learning model, and/or to predict sequences of words representing the components using the third machine learning model. The possible expansions may be sorted by the frequency of occurrence in the sentence table. In one or more examples, selected n-gram-word mappings, vowelless abbreviation-word mappings, and/or acronym-sequence mappings may be added to the mapping tables as new mappings for future data set merging requests.

During the similarity calculation stage, the similarities of the predicted sequences of words may be calculated. For example, similarity metrics, such as a cosine similarity measure or L2 similarity measure, may be computed to determine how similar the underlying contextual meaning of each respective variable abbreviation is to one another. The similarity calculation stage may include determining whether a similarity metric satisfies a merging condition. A merging instruction may be generated based on this determination. For example, if the similarity metric satisfies the merging condition, then these data sets likely represent similar data. Thus, in this example, the merging instruction may indicate that some or all of the data included within the differently labeled data sets can be merged. If not, then the data sets may not be merged together because they likely represent different data.

FIG. 1 illustrates an example system 100 for generating a merging instruction indicating whether to merge different data sets or portions thereof, in accordance with various embodiments. System 100 may include a computing system 102, user devices 130-1 to 130-N (e.g., collectively referred to as "user devices 130"), databases 140 (e.g., training data database 142, model database 144, domain specific content database 146, word database 148, phrase database 152, rules database 154), or other components. In some embodiments, components of system 100 may communicate with one another using network 150, such as the Internet.

User devices may be capable of communicating with one or more components of system 100 via network 150 and/or via a direct connection. User device 130 may refer to a computing device configured to interface with various components of system 100 to control one or more tasks, cause one or more actions to be performed, or effectuate other operations. For example, user device 130 may be configured to provide inputs to computing system 102 via network 150. Example computing devices that user devices 130 may correspond to include, but are not limited to, which is not to imply that other listings are limiting, desktop computers, servers, mobile computers, smart devices, wearable devices, cloud computing platforms, or other client devices. In some embodiments, each user device 130 may include one or more processors, memory, communications components, display components, audio capture/output devices, image capture components, or other components, or combinations thereof. Each user device 130 may include any type of wearable device, mobile terminal, fixed terminal, or other device.

It should be noted that, while one or more operations are described herein as being performed by particular components of computing system 102 and/or user devices 130, those operations may, in some embodiments, be performed by other components of system 100. As an example, while one or more operations are described herein as being performed by components of computing system 102, those operations may, in some embodiments, be performed by components of user devices 130. It should also be noted that, although some embodiments are described herein with respect to machine learning models, other prediction models (e.g., statistical models or other analytics models) may be used in lieu of or in addition to machine learning models in other embodiments (e.g., a statistical model replacing a machine-learning model and a non-statistical model replacing a non-machine-learning model in one or more embodiments). Furthermore, although a single instance of computing system 102 is depicted within system 100, additional instances of computing system 102 may be included.

Various data processing tasks require determining whether two or more different data sets can be joined together, and drawing conclusions and/or providing insights regarding those data sets. Oftentimes, the data may be labeled (e.g., column names) using abbreviations. However, technical problems arise when trying to perform these data merging tasks because the abbreviations used by the different data sets can differ even if the underlying data is of the same type. While data dictionaries can be provided that include abbreviation-to-word mapping, they are not always available, comprehensive, or useful. Furthermore, the data dictionaries can be time consuming to parse to identify mappings to be used. Still further, the lack of domain-specific knowledge can increase the time needed to analyze the data for similarities.

An obvious approach to expanding an abbreviation can include take the abbreviation as a whole and try to restore the whole abbreviation to its original form using a machine learning model trained to predict an original word (or words' combination) of an abbreviation. However, this approach can be unreliable, particularly when the abbreviations are complex. As noted, as used herein, a complex abbreviation may be an abbreviation that includes different abbreviated components (e.g., XXX_YYY_ZZZ), where each component is an abbreviation of a word. This may be due to rules for forming abbreviations of sentences or phrases can be flexible, making it difficult for a model to learn the rules and to predict the expansion of a complex abbreviation as a whole.

The techniques described herein describe a technical solution to the aforementioned technical problem that relates to dividing the abbreviations into components (when applicable), and restoring each component to its original word (or word combination). The technical solutions include identifying several certain ways to form a simple abbreviation, such as, for example, using the beginning n letters of a word, omitting vowels of a word, and using acronym of several words. In some embodiments, a specialized model corresponding to each observed simple abbreviation forming method may be trained to predict the original word (or word combination) for components of complex abbreviations. The most reasonable expansions for complex abbreviations may be selected based on the frequencies with which those expansions are occur within one or more domain specific corpuses.

A technical advantage of the described technical solution includes the development of a domain-independent technique to expand abbreviations (e.g., for data merging tasks). These domain-independent techniques have been developed using some common rules for generating abbreviations (e.g., in English) that have been identified. Existing methods to expand an abbreviation are domain-specific, limiting the scope of the data that can be analyzed by the machine learning models or requiring multiple models to be developed and trained for each domain.

To calculate the similarity of a pair of abbreviations, an obvious approach would be to calculate how similar the abbreviations are to one another using existing similarity techniques, such as, for example, fuzzy matching, word2vec, etc. However, technical problems arise using these approaches because they can produce ambiguous results caused by information loss during abbreviating and the confusion caused by the presence of similar abbreviations in different fields of expertise.

To overcome this technical problem, the technical solutions described herein include processes for defining, first, the field of expertise with which the data merging task is to be performed. By implementing this step first, the technical solutions can avoid confusion and reduce the search space for the models, thereby increasing a speed with which results, and subsequently data merging, can occur. Next, each component of an abbreviation may be expanded into several possible words and phrases can be generated with the possible combinations of the generated words (keeping the original order) using the machine learning models trained on domain-specific corpus. This step can act as an information gain process based on the domain-specific corpus, which can make the generated phrase more accurate and informative than the original abbreviation. Furthermore, the domain-specific corpus can act as a knowledge base to provide the information needed to restore the words and generate the phrases.

For supervised machine learning-based abbreviation expansion, one approach can be to discover the expansion in a similar context with the abbreviation. This approach, however, suffers from technical problems relating to the lack of a corpus containing both abbreviations and their corresponding expansions. The techniques described herein further overcome these technical problems using technical solutions including selecting features and outcomes to construct training data in a non-conventional manner. Additionally, the process for selecting the features and outcomes may be based on observations of rules hidden in complex abbreviations, which has less requirements for the corpus and can be more robust as a result of the realization that the expansion function can be executed through several separated models.

For the target abbreviation to expand, one approach may be to expand simple abbreviations compressed by single words. However, this approach presents a technical problem in that the models used would not be able to handle abbreviations for phrases consisting of multiple words. The technical solutions described herein address this technical problem by considering the expansion of complex abbreviations by splitting these abbreviations into several components. Each component can be restored to its original word separately and a phrase may then be generated based on the restored words. This technical solution provides a particular technical advantage in that it is an effective approach for expanding complex abbreviations.

Computing system 102 may include a data preprocessing subsystem 110, a model training subsystem 112, a data merging subsystem 114, or other components. Each of data preprocessing data preprocessing subsystem 110, model training subsystem 112, and data merging subsystem 114 may be configured to communicate with one another, one or more other devices, systems, servers, etc., using one or more communication networks (e.g., the Internet, an Intranet). System 100 may also include one or more databases 140 (e.g., training data database 142, model database 144, domain specific content database 146, word database 148, phrase database 152, rules database 154) used to store data for training one or more machine learning models, store one or more machine learning models that have been trained or that are to be trained (or re-trained), or storing other data used by one or more components of system 100. This disclosure anticipates the use of one or more of each type of system and component thereof without necessarily deviating from the teachings of this disclosure. Although not illustrated, other intermediary devices (e.g., data stores of a server connected to computing system 102) can also be used.

In some embodiments, computing system 102 may be configured to perform one or more data pre-processing steps to generate data for training one or more machine learning models and/or determining whether two (or more) data sets can be merged together. For example, data preprocessing subsystem 110 of computing system 102 may be configured to generate one or more data tables. For example, data preprocessing subsystem 110 may generate a word table, a sentence table, a mapping table, and/or other tables. These tables may be used to form training data that can be used to train one or more machine learning models to perform various aspects of the abbreviation expansion and data similarity calculations.

Figure 2A:
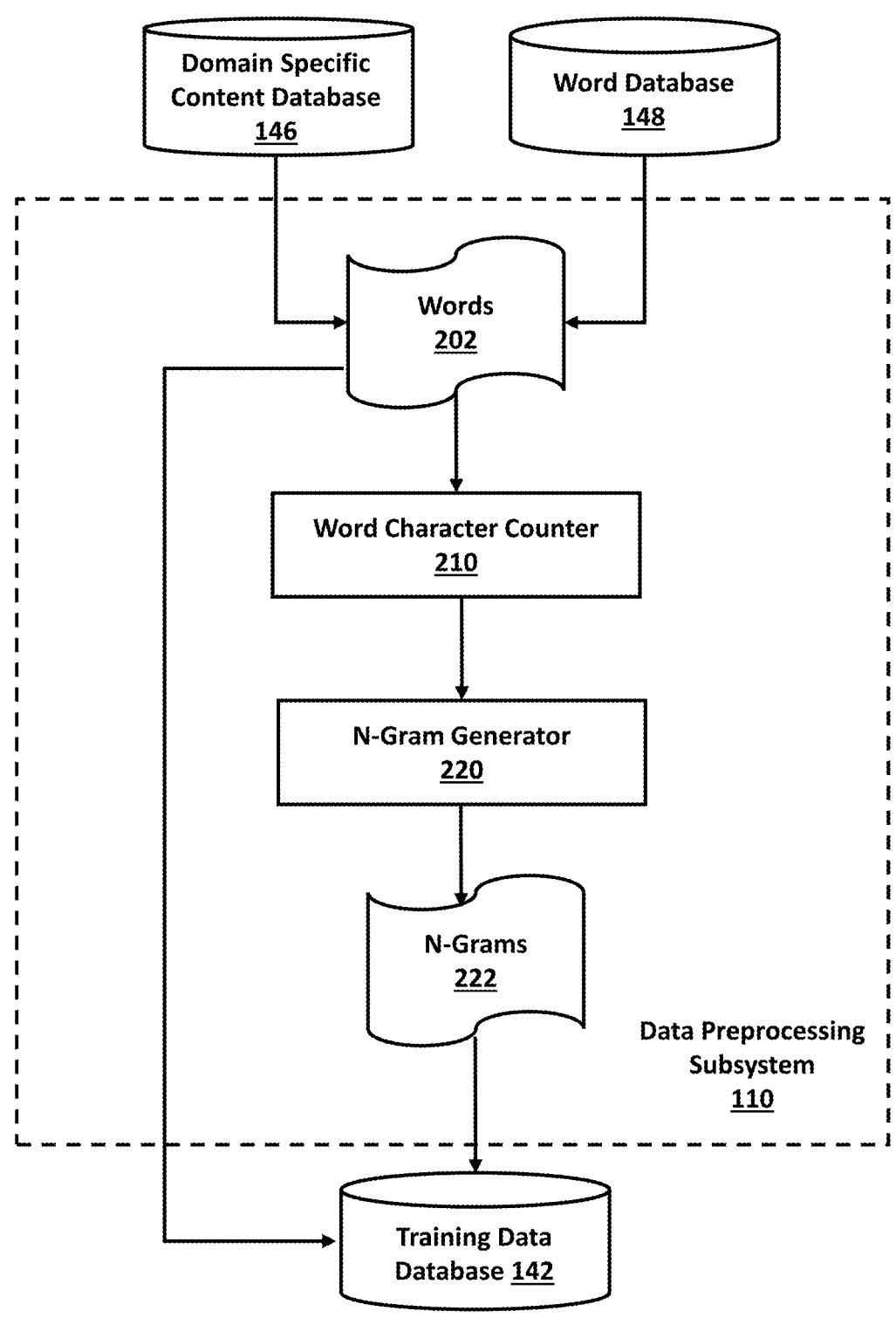
FIGS. 2A-2D illustrate example processes for pre-processing data, in accordance with various embodiments.
Figure 2B:
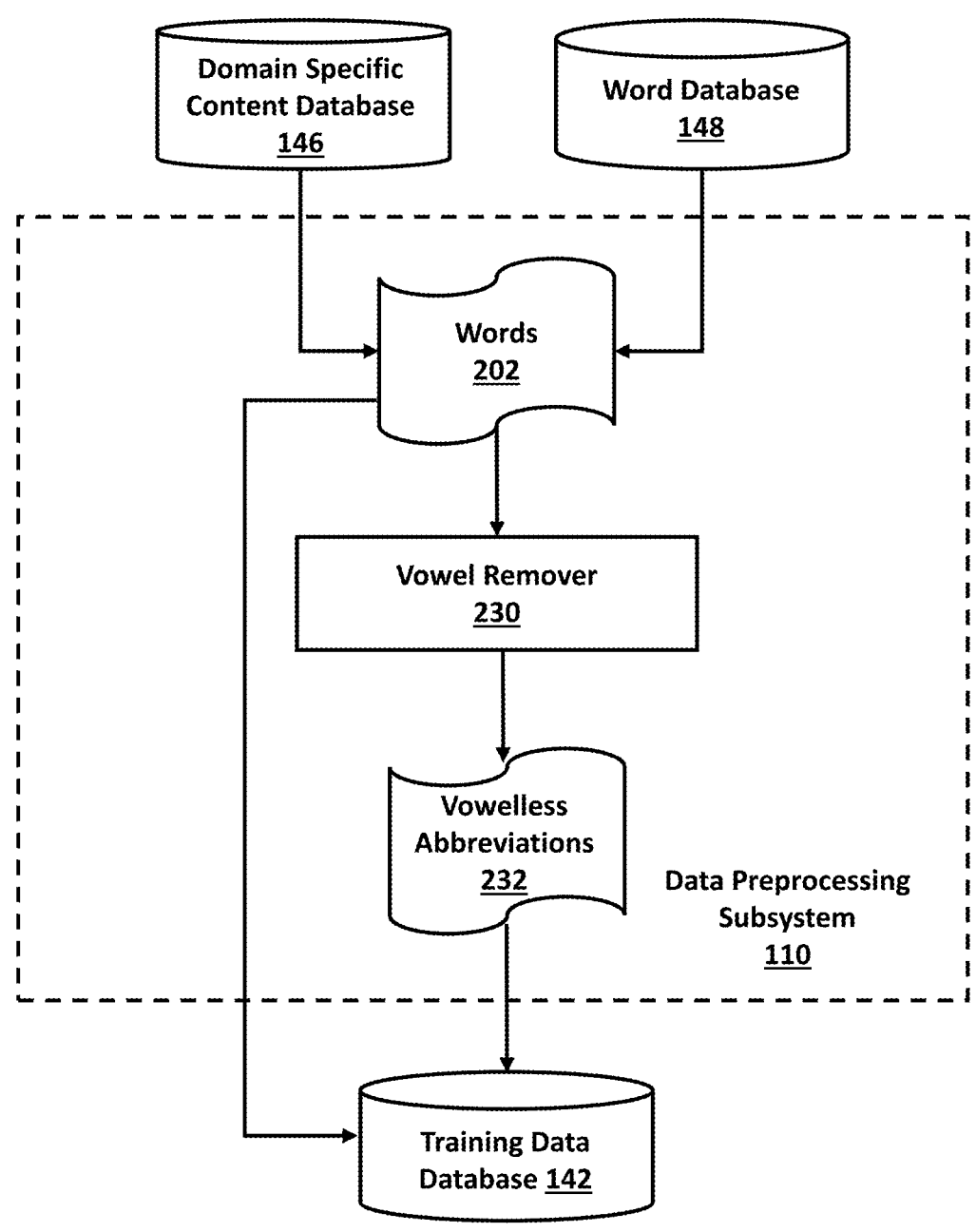
Figure 2C:
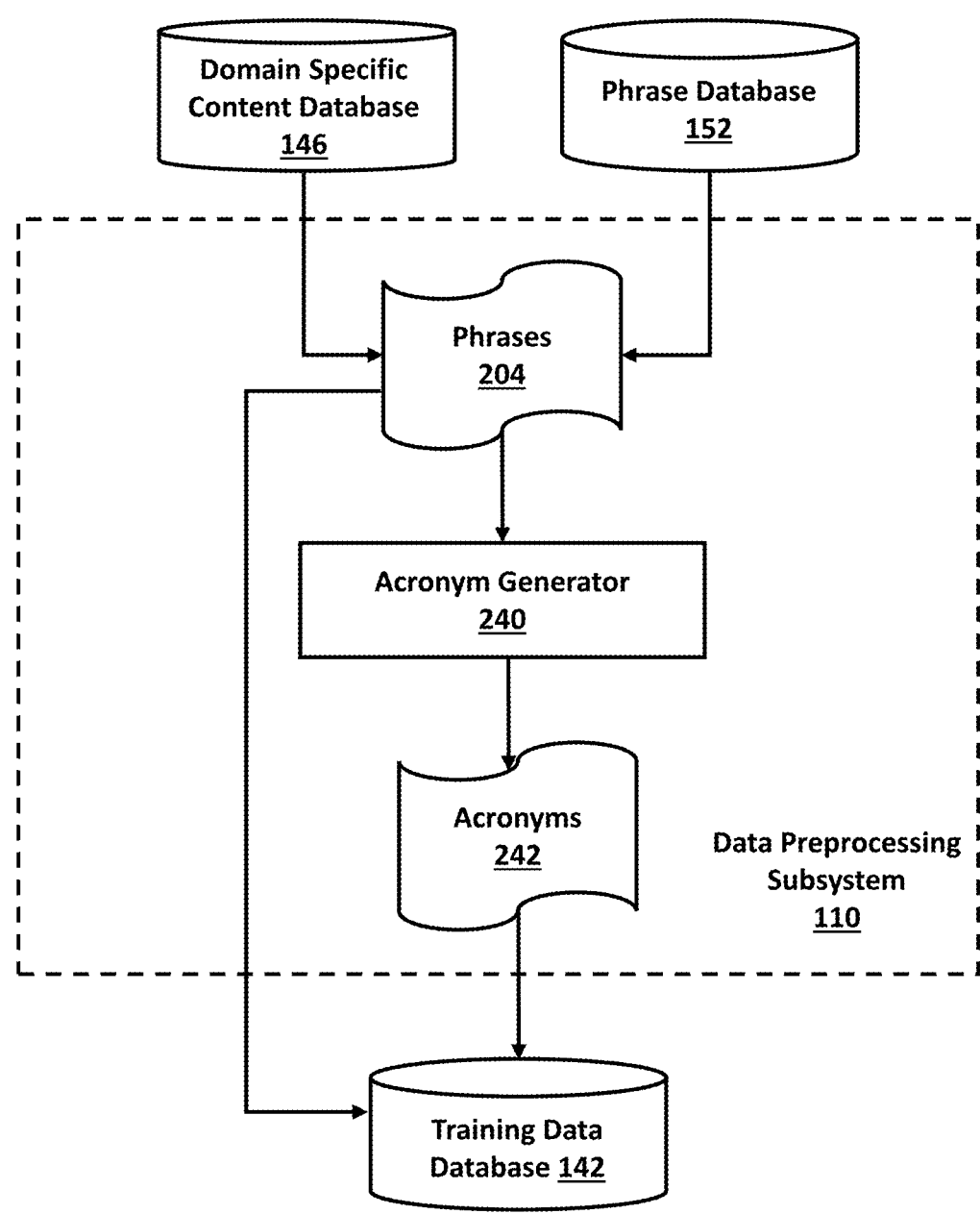
Figure 2D:
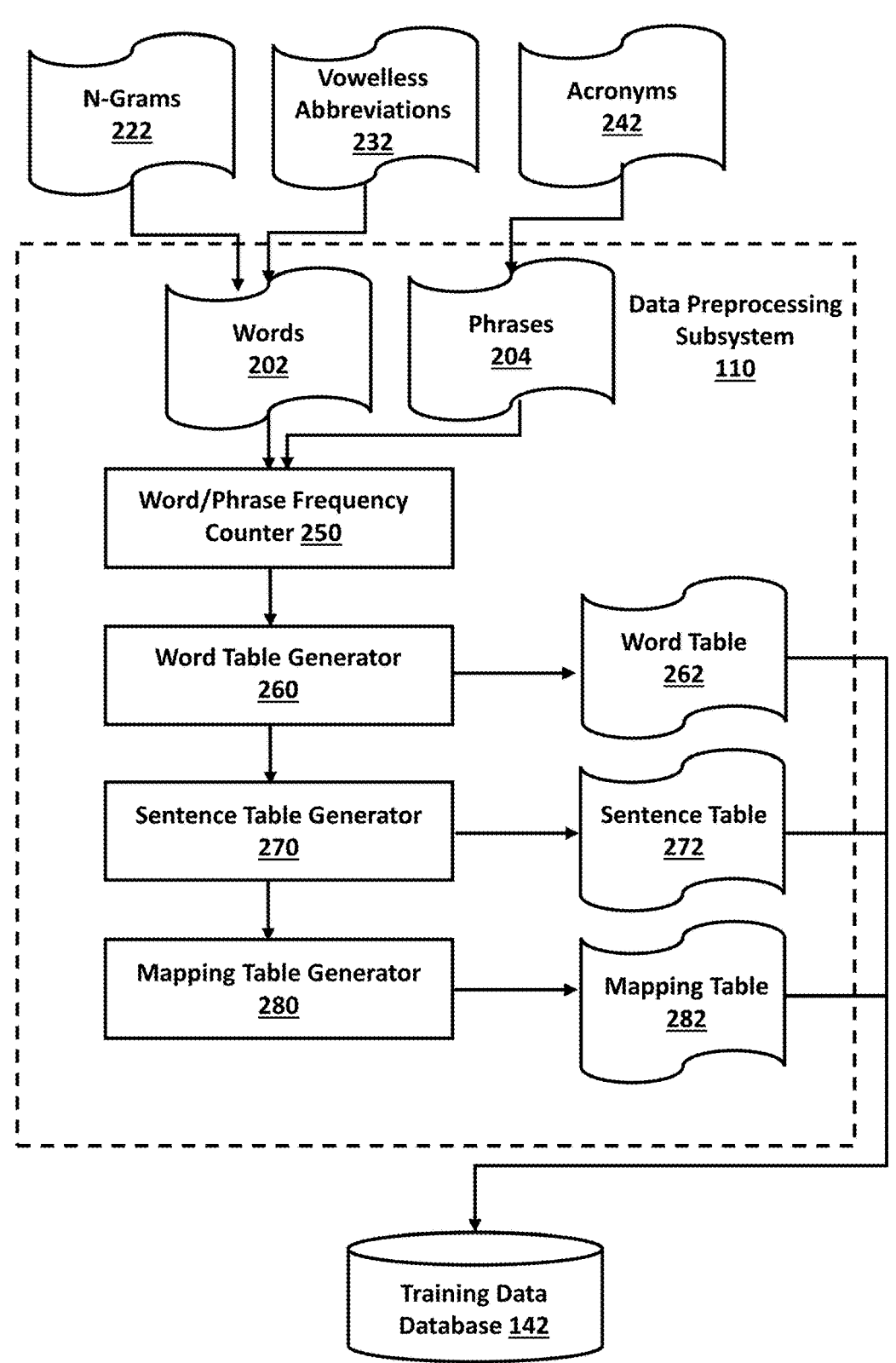

As an example, with reference to FIGS. 2A-2D, data preprocessing subsystem 110 may be configured to generate a word table, a sentence table, a mapping table, or other tables (e.g., word table 262, sentence table 272, and mapping table 282 of FIG. 2D) as well as training data using the word table, sentence table, and mapping table. The word table may include a predefined listing of nouns (e.g., commonly occurring nouns) and a plurality of domain specific words.

In some embodiments, as seen within FIG. 2A, data preprocessing subsystem 110 may be configured to retrieve a plurality of words, such as words 202, from domain specific content database 146, word database 148, or other data sources. In one or more examples, words retrieved from domain specific content database 146 may comprise words included within obtained content, such as texts (e.g., books, magazines, articles, etc.), spoken words (e.g., movies, televisions, radio programs, etc.) converted from audio to text, or other forms of content (e.g., artificially generated content). In one or more examples, words retrieved from word database 148 may comprise words having known abbreviations. These words may be identified from known abbreviation-word mappings and/or learned abbreviation-word mappings. In some examples, words 202 may include a predefined listing of nouns (e.g., commonly occurring nouns) and/or one or more domain specific words. In one or more examples, the commonly occurring nouns may be determined based on an analysis of various domain specific content within domain specific content database 146. For example, commonly occurring nouns may be determined based on the frequency with which those nouns appear in one or more corpuses of text (e.g., content). In some examples, the content used to determine a frequency with which a particular noun occurs may be stored in domain specific content database 146, word database 148, phrase database 152, or from other sources collected manually, via web-crawling, and/or using artificial intelligence. The domain specific words may correspond to words commonly found in certain domain specific content. For example, words like "pharaoh," "pyramid," and "desert" may commonly be found in content related to Ancient Egypt.

Data preprocessing subsystem 110 may be configured to determine, using word character counter 210, a number of words within each of words 202. For example, word character counter 210 may determine whether a given word of words 202 includes three characters, four characters, five characters, or more. Words 202 along with the determined character counts may be input to n-gram generator 220. N-gram generator 220 may be configured to generate n-grams 222, where each of n-grams 222 comprise an n-gram of a word created based on that word's character count. For example, one or more rules (e.g., stored within rules database 154) may specify a size of an n-gram to be used for a word's abbreviation. The rules may include, for example, generating a bi-gram if the character count of a word is 3 (e.g., includes 3 characters), generating a tri-gram if the character count of a word is 4 (e.g., includes 4 characters), and generating a tri-gram and a 4-gram if the character count of a word is 5 or more (e.g., include 5 or more characters). In some examples, the abbreviations may correspond to an n-gram formed from the first n characters of a word. For example, an abbreviation for the word "vacant" may be "VAC." Alternatively, the n-gram may be formed of a last n characters of a word.

In some embodiments, data preprocessing subsystem 110 may be configured to store words 202 and n-grams 222 in training data database 142. For example, the training data may comprise pairs of n-grams and their corresponding words. In one or more examples, a label indicating a particular domain with which words 202 correspond may be stored with the training data.

In some embodiments, as seen within FIG. 2B, data preprocessing subsystem 110 may be configured to retrieve a plurality of words, such as words 202, from domain specific content database 146, word database 148, or other data sources. In one or more examples, words retrieved from domain specific content database 146 may comprise words included within obtained content, such as texts (e.g., books, magazines, articles, etc.), spoken words (e.g., movies, televisions, radio programs, etc.) converted from audio to text, or other forms of content (e.g., artificially generated content). In one or more examples, words retrieved from word database 148 may comprise words having known or pre-formed vowelless abbreviations. These words may be identified from known vowelless abbreviation-word mappings and/or learned vowelless abbreviation-word mappings. In some examples, words 202 may include a predefined listing of nouns (e.g., commonly occurring nouns) and/or domain-specific words. The commonly occurring nouns may be determined based on an analysis of various domain specific content within domain specific content database 146. For example, commonly occurring nouns may be determined based on the frequency with which those nouns appear in one or more corpuses of text (e.g., content). In some examples, the content used to determine noun-frequency may be stored in domain specific content database 146, word database 148, phrase database 152, or from other sources collected manually, via web-crawling, and/or using artificial intelligence. The domain specific words may correspond to words commonly found in certain domain specific content. For example, words like "pharaoh," "pyramid," and "desert" may commonly be found in content related to Ancient Egypt.

Data preprocessing subsystem 110 may be configured to remove, using vowel remover 230, vowels from words 202 to create vowelless abbreviations 232. For example, the word "star" may have the vowelless abbreviation "str," the word "database" may have the vowelless abbreviation "dtbs," and the like. In some embodiments, data preprocessing subsystem 110 may be configured to store words 202 and vowelless abbreviations 232 in training data database 142. For example, the training data may comprise pairs of vowelless abbreviations and their corresponding words. In one or more examples, a label indicating a particular domain with which words 202 correspond may be stored with the training data.

In some embodiments, as seen within FIG. 2C, data preprocessing subsystem 110 may be configured to retrieve a plurality of phrases, such as phrases 204, from domain specific content database 146, phrase database 152, or other data sources. As described herein, a phrase refers to a sequence of words forming generated with a combination of original words. As such, as described herein, the term "phrase" and the term "sequence of words" can be used interchangeably. For example, the words "be," "right," and "back," in a sequence may form the phrase "be right back." This phrase may have a known acronym, "BRB." Here, the first "B" corresponds to the word "be," the "R" corresponds to the word "right," and the second "B" corresponds to the word "back." In one or more examples, phrases retrieved from domain specific content database 146 may comprise phrases included within obtained content, such as texts (e.g., books, magazines, articles, etc.), spoken phrases (e.g., movies, televisions, radio programs, etc.) converted from audio to text, or other forms of content (e.g., artificially generated content). In one or more examples, phrases retrieved from phrase database 152 may comprise phrases (e.g., sequences of words) having known or preformed acronyms (e.g., BRB). These phrases may be identified from known acronym-phrase mappings and/or learned acronym-phrase mappings. In some examples, phrases 204 may include commonly occurring sequences of words (e.g., sentences). The commonly occurring sequences of words may be predetermined and/or determined based on an analysis of various domain specific content within domain specific content database 146. For example, commonly occurring sequences of words may be determined based on the frequency with which they appear in one or more corpuses of text (e.g., content). In some examples, the content used to determine the frequency with which different sequences of words occur may be stored in domain specific content database 146, word database 148, phrase database 152, or from other sources collected manually, via web-crawling, and/or using artificial intelligence. The domain specific sequences of words may correspond to sequences of words (e.g., phrases) commonly found in certain domain specific content. For example, phrases like "Household income," "non-family household," and "visa application center" may commonly be found in content related to data analytics and processing.

Data preprocessing subsystem 110 may be configured to generate, using acronym generator 240, acronyms 242 from phrases 204. For example, the phrase "non-family household" may have the acronym "NFH." In some embodiments, data preprocessing subsystem 110 may be configured to store phrases 204 and acronyms 242 in training data database 142. For example, the training data may comprise pairs of acronyms and their corresponding phrases. In one or more examples, a label indicating a particular domain with which phrases 204 correspond may be stored with the training data.

FIG. 2D illustrates an example of data preprocessing subsystem 110 used to generate word table 262, sentence table 272, mapping table 282, or other tables, in accordance with various embodiments. In some embodiments, data preprocessing subsystem 110 may include a word/phrase frequency counter 250, a word table generator 260, a sentence table generator 270, a mapping table generator 280, or other components. Word/phrase frequency counter 250 may be configured to generate a ranked list of words 202 and phrases 204 based on how frequently each of words 202 and phrases 204 appear within domain specific content stored within domain specific content database 146. In some embodiments, word/phrase frequency counter 250 may be configured to generate an inverse ranked list of words 202 and phrases 204. For example, a term-frequency-inverse document frequency measure may be generated indicating how frequently a given word and/or phrase appears within a corpus of documents. In some embodiments, word/phrase frequency counter 250 may generate a list include a top N most frequently occurring words and/or phrases from one or more documents.

Word table generator 260 may be configured to generate word table 262 using words 202. For example, the ranked (inverse or non-inverse) list of words may be used to generate word table 262. In some embodiments, word table 262 may include commonly used English nouns (of which there are approximately 5,000) and domain specific words associated with one or more domains. Domain specific content database 146 may store one or more documents associated with one or more domains, and for each domain, commonly used nouns may be identified by word table generator 260. In some examples, word table generator 260 may access a list of word frequencies from word/phrase frequency counter 250. The generated word table, word table 262, may be stored in training data database 142 for training of one or more machine learning models.

Sentence table generator 270 may be configured to generate sentence table 272. Sentence table 272 may include a plurality of sentences from one or more domain specific corpuses, such as domain specific content database 146. Certain sentences (e.g., sequences of words) may commonly be found in certain domain specific content. For instance, "Vacant house units" may frequency be used in a demography domain. In some examples, word/phrase frequency counter 250 may be configured to access a list of sentences/phrases. The list may be used by sentence table generator 270 to generate sentence table 272. In one or more examples, sentence table 272 may include such commonly identified sentences (e.g., commonly found in one or more domain specific documents).

Mapping table generator 280 may be configured to generate mapping table 282. Mapping table 282 may include mappings between abbreviations of words and their corresponding words. In some examples, the abbreviations correspond to n-grams 222. In this example, mapping table 282 may include mappings of an n-gram of a given word to that word (e.g., "vac"→"vacant"). In some examples, the abbreviations correspond to vowelless abbreviations 232 formed by removing the vowels from a word. For example, a vowelless abbreviation of the word "asterisk" may be "strsk." In this example, mapping table 282 may include mappings of vowelless abbreviations of a given word to that word (e.g., "strsk"→"asterisk"). In some examples, the mapping table may also store mappings of acronyms 242 to their corresponding sequences of words (e.g., phrases 204). For example, the acronym "NFH" may represent the sequence of words "Non-Family Household." In some embodiments, data preprocessing subsystem 110 may be configured to store word table 262, sentence table 272, mapping table 282, and/or other information, to training data database 142 for training one or more machine learning models, as described below.

In some embodiments, computing system 102 may be configured to determine whether two or more data sets are to be merged using one or more machine learning models. For example, model database 144 may store one or more machine learning models that can be used to perform various NLP tasks to determine whether variables used to label data from different data sets represent contextually similar data, and therefore can be merged. Model database 144 may store, for example, a first machine learning model, a second machine learning model, a third machine learning model, and/or other machine learning models, statistic models, and the like. In some examples, model database 144 may store one or more generative machine learning models. The machine learning techniques that can be used in the systems/subsystems/modules described herein may include, but are not limited to (which is not to suggest that any other list is limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, Large Language Models (LLMs), transformers, encoder-decoder architecture, or separable convolutions (e.g., depth-separable convolutions, spatial separable convolutions).

Figure 3A:
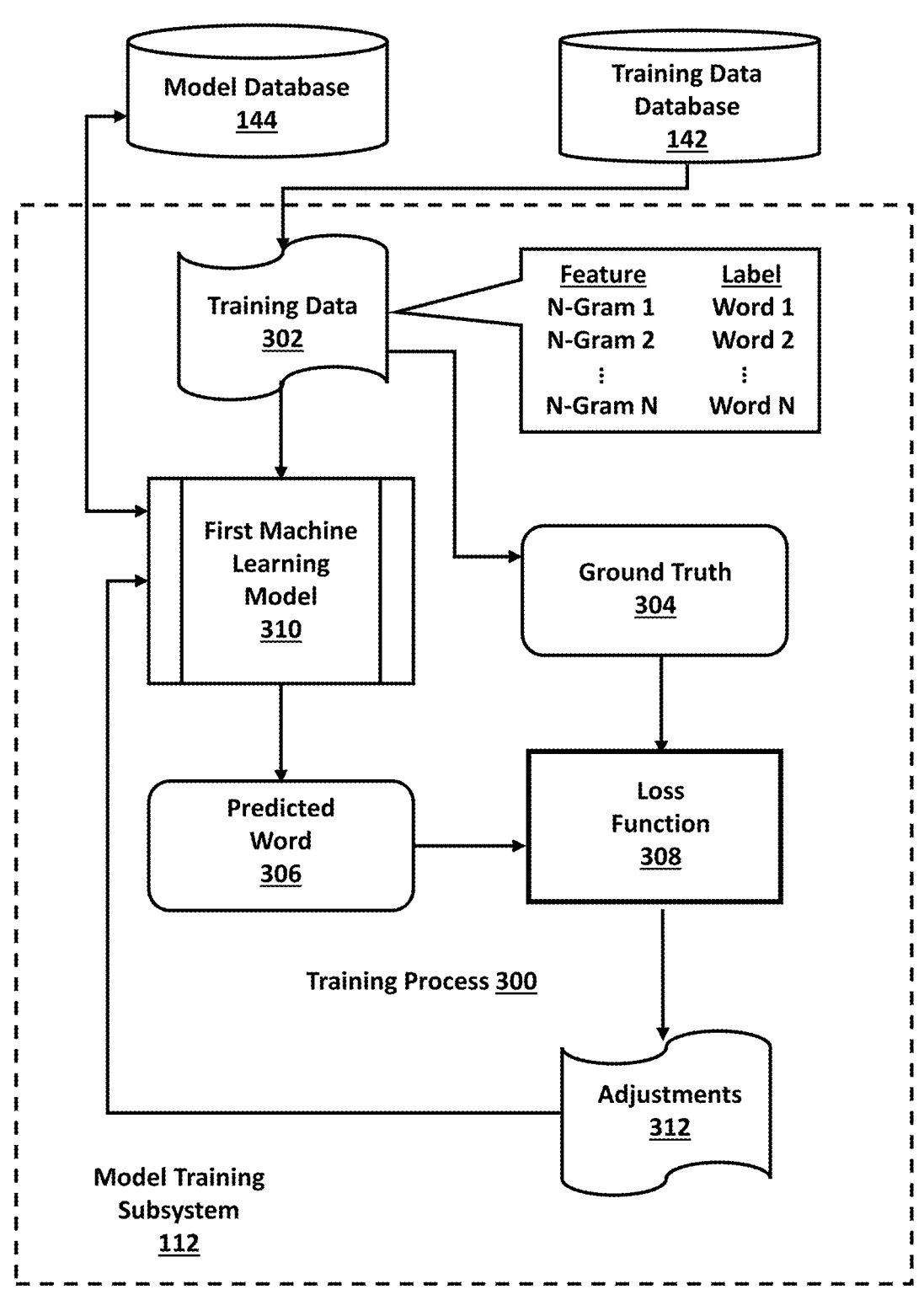
FIGS. 3A-3C illustrate example processes for training machine learning models for abbreviation expansion and comparison, in accordance with various embodiments.

In some embodiments, computing system 102 may include model training subsystem 112 for training the various machine learning models described herein. As an example, with reference to FIG. 3A, model training subsystem 112 may be configured to train, using a first training process 300, a first machine learning model 310 to predict an original word based on an n-gram of the original word. In some embodiments, model training subsystem 112 may train first machine learning model 310 by selecting a plurality of words from a corpus. For each word of the plurality of words from the corpus, model training subsystem 112 may select an n-gram of the word. A size of the n-gram selected for each word of the plurality of words may be based on a number of characters included in the word. For example, if the word has a length of 3 (e.g., 3 characters), then a size of the n-gram selected for that word may be 2 (e.g., a bi-gram). If the word has a length of 4 (e.g., 4 characters), then a size of the n-gram selected for that word may be 3 (e.g., a tri-gram).

If the word has a length of 5 or more (e.g., 5 or more characters), then a size of the n-gram selected for that word may be 4 (e.g., a 4-gram).

Pairs of n-grams and words may be created and structured as features (X) and labels (Y) within training data 302. For example, a first feature to be input to first machine learning model 310 from training data 302 may comprise the n-gram "N-Gram 1." The ground truth for this n-gram may be the word "Word 1."

For each n-gram/word pair, model training subsystem 112 may be configured to input the n-gram into first machine learning model 310 to obtain a prediction of the word. For example, the n-gram "N-Gram 1" may be input to first machine learning model 310 to generate predicted word 306. Model training subsystem 112 may be configured to compute a loss function 308 based on a difference between the prediction of the word (e.g., predicted word 306) and ground truth 304. For example, if the n-gram "N-Gram 1" had been input to first machine learning model, the predicted word 306 would be compared to the original word "Word 1" to determine the loss. Model training subsystem 112 may further be configured to determine one or more adjustments 312 to one or more hyper-parameters of first machine learning model 310 based on computed loss function 308. Adjustments 312 to the hyper-parameters may be to improve predictive capabilities of first machine learning model 310. For example, based on loss function 308, weights and/or biases of one or more nodes of first machine learning model 310 may be adjusted. First training process 300 may repeat until an accuracy of first machine learning model 310 reaches a predefined accuracy level (e.g., 95% accuracy or greater, 99% accuracy or greater, etc.), at which point first machine learning model 310 may be stored in model database 144 as a trained machine learning model. The accuracy of first machine learning model 310 may be determined based on a number of correct predictions (e.g., predicted word 306).

Persons of ordinary skill in the art will recognize that other training processes may be used to train a machine learning model used by components of system 100. Thus, first training process 300 should not be construed as limiting the disclosed embodiments to particular training processes. In first training process 300, training data 302 may be retrieved from training data database 142. Different training data may be used to train different types of machine learning models. Furthermore, validation data may also be stored in training data database 142. The training data and the validation data may be identified and retrieved prior to first training process 300 beginning. In some embodiments, training data 302 may include features (e.g., n-grams of words) and labels (e.g., original words associated with the n-grams), or other information, or combinations thereof.

In some embodiments, model training subsystem 112 may select a to-be-trained machine learning model (e.g., first machine learning model 310), which may be retrieved from model database 144. First machine learning model 310 may be selected based on domain specific content associated with the training data, a frequency with which the words included within training data 302 are included within the domain specific content, or other information, or combinations thereof. Model training subsystem 112 may select training data 302, which may be retrieved from training data database 142. Model training subsystem 112 may select training data 302 from one or more sets of generated training data based on a type of machine learning model that was selected and/or a desired output of first machine learning model 310 (upon training).

Second Machine Learning Model

Figure 3B:
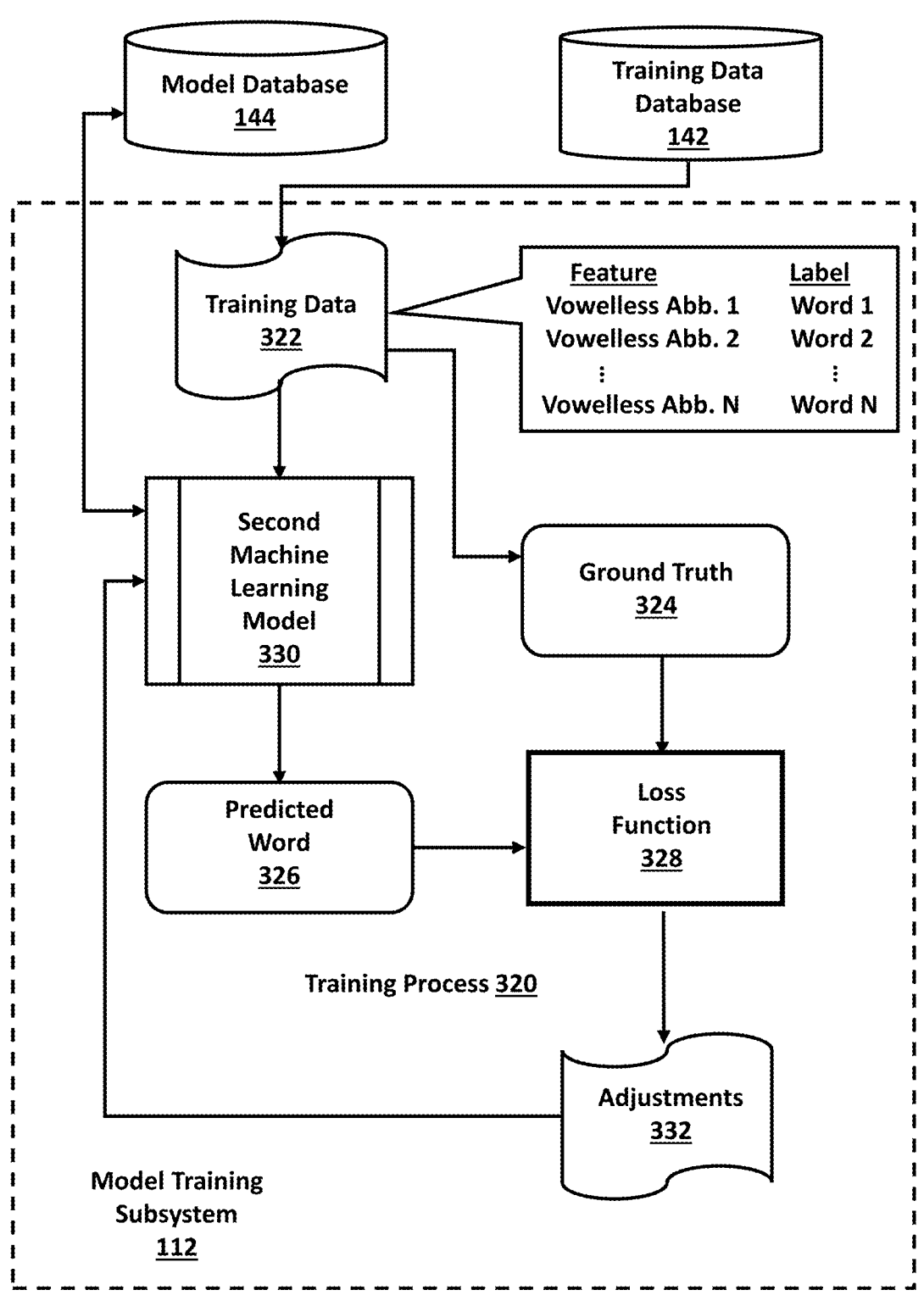

As an example, with reference to FIG. 3B, model training subsystem 112 may be configured to train, using a second training process 320, a second machine learning model 330 to predict an original word based on a vowelless abbreviation of the original word. In some embodiments, model training subsystem 112 may train second machine learning model 330 by selecting a plurality of words from a corpus. For each word of the plurality of words from the corpus, model training subsystem 112 may create a vowelless abbreviation of the word. The vowelless abbreviation of the word may be created by removing the vowels from the word. In one or more examples, additional characters may be removed (e.g., the letter "y" from certain words).

Pairs of vowelless abbreviations and words may be created and structured as features (X) and labels (Y) within training data 322. For example, a first feature to be input to second machine learning model 330 from training data 322 may comprise the vowelless abbreviation "Vowelless Abb. 1." The ground truth (e.g., ground truth 324) for this vowelless abbreviation may be the word "Word 1."

For each vowelless abbreviation/word pair, model training subsystem 112 may be configured to input the vowelless abbreviation into second machine learning model 330 to obtain a prediction of the word. For example, the vowelless abbreviation "Vowelless Abb. 1" may be input to second machine learning model 330 to generate predicted word 326. Model training subsystem 112 may be configured to compute a loss function 328 based on a difference between the prediction of the word (e.g., predicted word 326) and ground truth 324. For example, if the vowelless abbreviation "Vowelless Abb. 1" was input to second machine learning model 330, predicted word 326 would be compared to ground truth 324 (e.g., "Word 1") to determine loss function 328. Model training subsystem 112 may further be configured to determine one or more adjustments 332 to one or more hyper-parameters of second machine learning model 330 based on computed loss function 328. Adjustments 332 to the hyper-parameters may be to improve predictive capabilities of second machine learning model 330. For example, based on loss function 328, weights and/or biases of one or more nodes of second machine learning model 330 may be adjusted. Second training process 320 may repeat until an accuracy of second machine learning model 330 reaches a predefined accuracy level (e.g., 95% accuracy or greater, 99% accuracy or greater, etc.), at which point second machine learning model 330 may be stored in model database 144 as a trained machine learning model. The accuracy of second machine learning model 330 may be determined based on a number of correct predictions (e.g., predicted word 326).

Persons of ordinary skill in the art will recognize that other training processes may be used to train a machine learning model used by components of system 100. Thus, second training process 320 should not be construed as limiting the disclosed embodiments to particular training processes. In second training process 320, training data 322 may be retrieved from training data database 142. Different training data may be used to train different types of machine learning models. Furthermore, validation data may also be stored in training data database 142. The training data and the validation data may be identified and retrieved prior to second training process 320 beginning. In some embodiments, training data 322 may include features (e.g., vowelless abbreviations of words) and labels (e.g., original words associated with the vowelless abbreviations), or other information, or combinations thereof.

In some embodiments, model training subsystem 112 may select a to-be-trained machine learning model (e.g., second machine learning model 330), which may be retrieved from model database 144. Second machine learning model 330 may be selected based on domain specific content associated with the training data, a frequency with which the words included within training data 322 are included within the domain specific content, or other information, or combinations thereof. Model training subsystem 112 may select training data 322, which may be retrieved from training data database 142. Model training subsystem 112 may select training data 322 from one or more sets of generated training data based on a type of machine learning model that was selected and/or a desired output of second machine learning model 330 (upon training).

Third Machine Learning Model

Figure 3C:
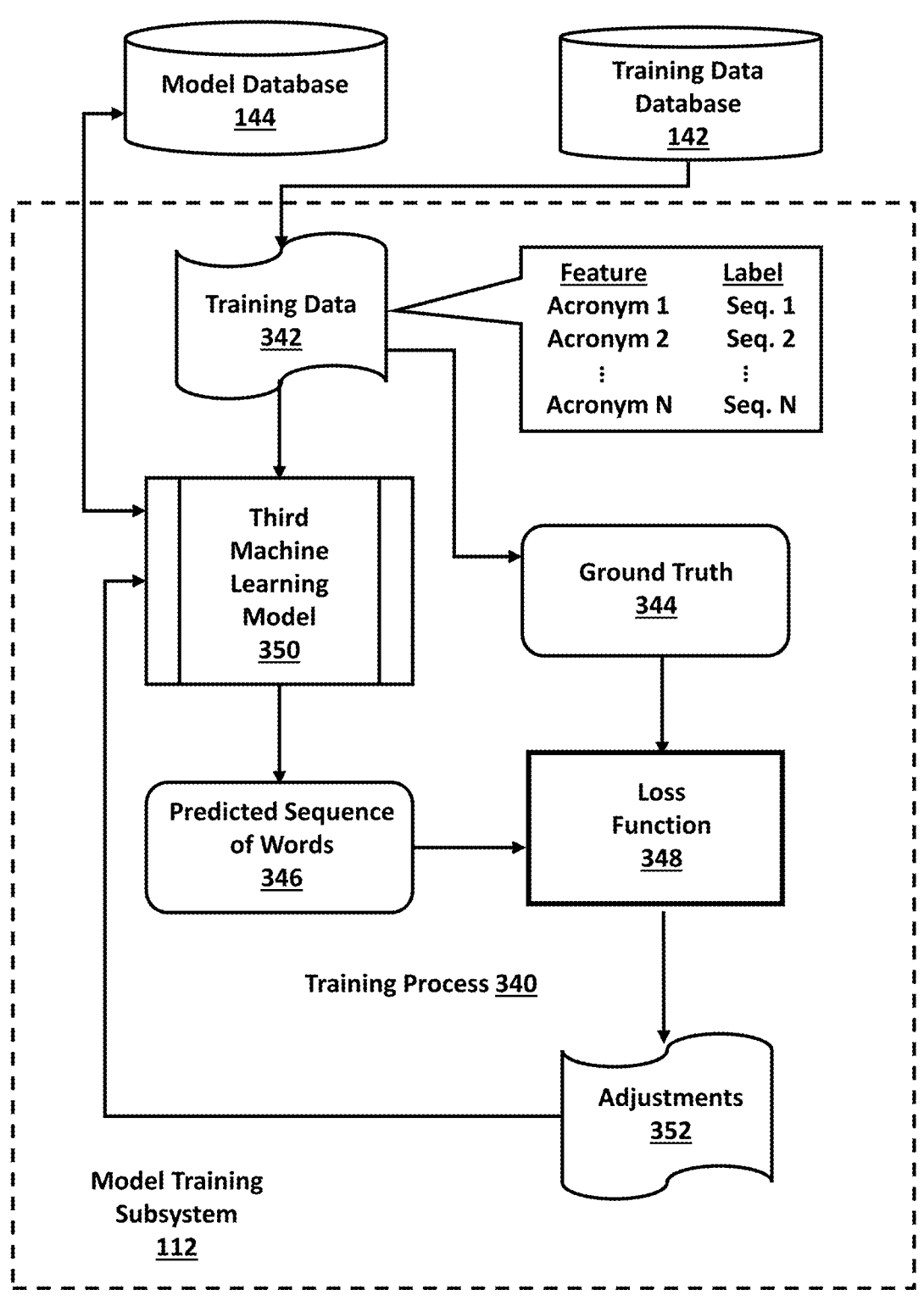

As an example, with reference to FIG. 3C, model training subsystem 112 may be configured to train, using a third training process 340, a third machine learning model 350 to predict a sequence of words from an acronym representing the sequence of words. In some embodiments, model training subsystem 112 may train third machine learning model 350 by selecting a plurality of phrases (e.g., sequences of words) from a corpus. For each sequence of words from the corpus, model training subsystem 112 may create an acronym of the sequence. The acronym may be created by selecting one or more characters (e.g., the first letter) of each word to represent that word within the sequence of words.

Pairs of acronyms and sequences of words may be created and structured as features (X) and labels (Y) within training data 342. For example, a first acronym to be input to third machine learning model 350 from training data 342 may comprise an acronym "Acronym 1." The ground truth (e.g., ground truth 344) for this acronym may be the sequence of words "Sequence 1."

For each acronym/sequence pair, model training subsystem 112 may be configured to input the acronym into third machine learning model 350 to obtain a prediction of the word. For example, the acronym "Acronym 1" may be input to third machine learning model 350 to generate predicted word 346. Model training subsystem 112 may be configured to compute a loss function 348 based on a difference between the prediction of the sequence of words (e.g., predicted sequence of words 346) and ground truth 344. For example, if the acronym "Acronym 1" had been input to third machine learning model 350, predicted sequence of words 346 would be compared to ground truth 344 (e.g., "Sequence 1") to determine loss function 348. Model training subsystem 112 may further be configured to determine one or more adjustments 352 to one or more hyper-parameters of third machine learning model 350 based on computed loss function 348. Adjustments 352 to the hyperparameters may be to improve predictive capabilities of third machine learning model 350. For example, based on loss function 348, weights and/or biases of one or more nodes of third machine learning model 350 may be adjusted. Process 340 may repeat until an accuracy of third machine learning model 350 reaches a predefined accuracy level (e.g., 95% accuracy or greater, 99% accuracy or greater, etc.), at which point third machine learning model 350 may be stored in model database 144 as a trained machine learning model. The accuracy of third machine learning model 350 may be determined based on a number of correct predictions (e.g., prediction 346).

Persons of ordinary skill in the art will recognize that other training processes may be used to train a machine learning model used by components of system 100. Thus, third training process 340 should not be construed as limiting the disclosed embodiments to particular training processes. In third training process 340, training data 342 may be retrieved from training data database 142. Different training data may be used to train different types of machine learning models. Furthermore, validation data may also be stored in training data database 142. The training data and the validation data may be identified and retrieved prior to third training process 340 beginning. In some embodiments, training data 342 may include features (e.g., acronyms representing sequences of words) and labels (e.g., the sequences of words associated with the acronyms), or other information, or combinations thereof.

In some embodiments, model training subsystem 112 may select a to-be-trained machine learning model (e.g., third machine learning model 350), which may be retrieved from model database 144. Third machine learning model 350 may be selected based on domain specific content associated with the training data, a frequency with which the sequences of words included within training data 342 are included within the domain specific content, or other information, or combinations thereof. Model training subsystem 112 may select training data 342, which may be retrieved from training data database 142. Model training subsystem 112 may select training data 342 from one or more sets of generated training data based on a type of machine learning model that was selected and/or a desired output of third machine learning model 350 (upon training).

Figure 4A:
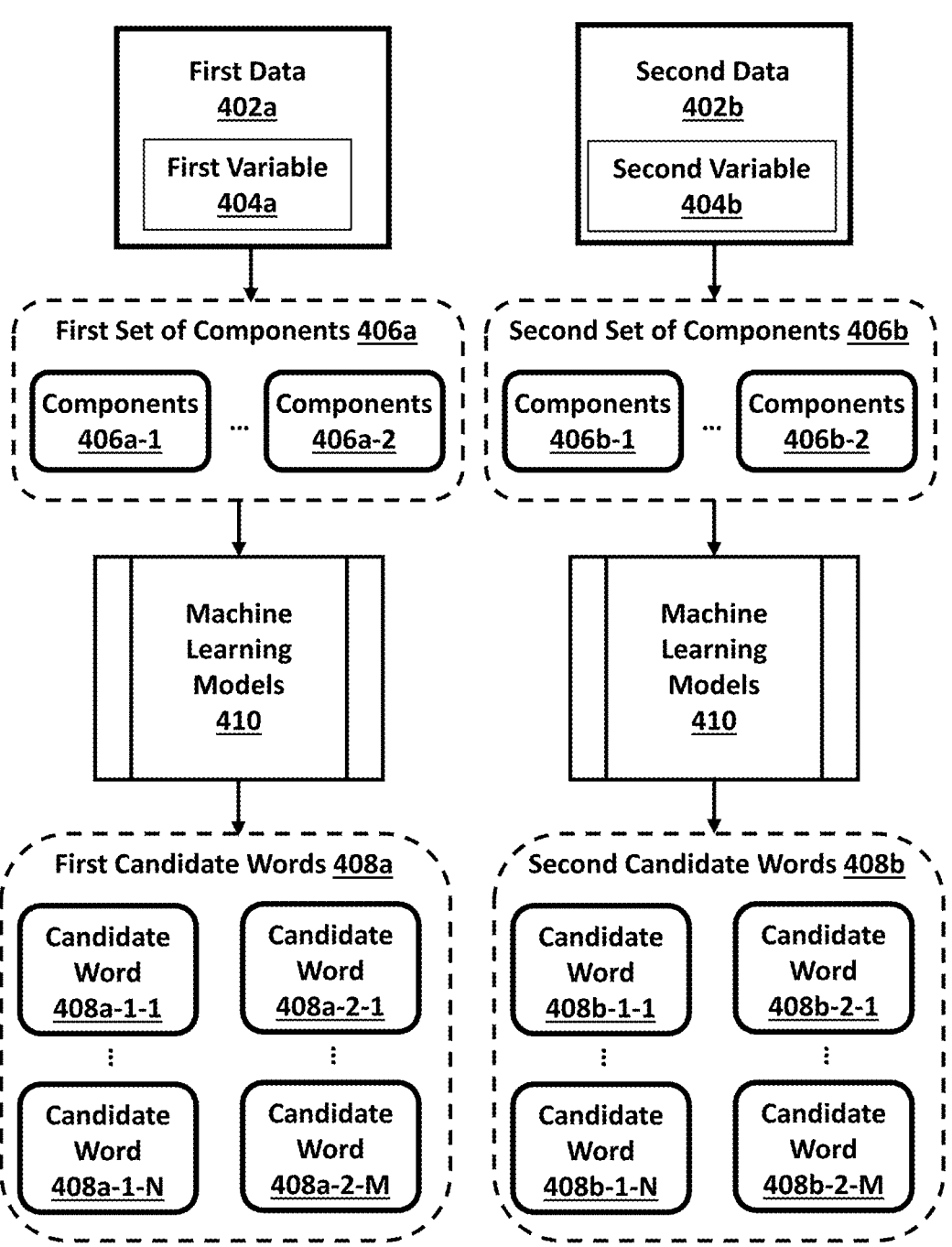
FIGS. 4A-4B illustrate an example workflow for generating predicted sequences of words for similarity comparisons, in accordance with various embodiments.
Figure 4B:
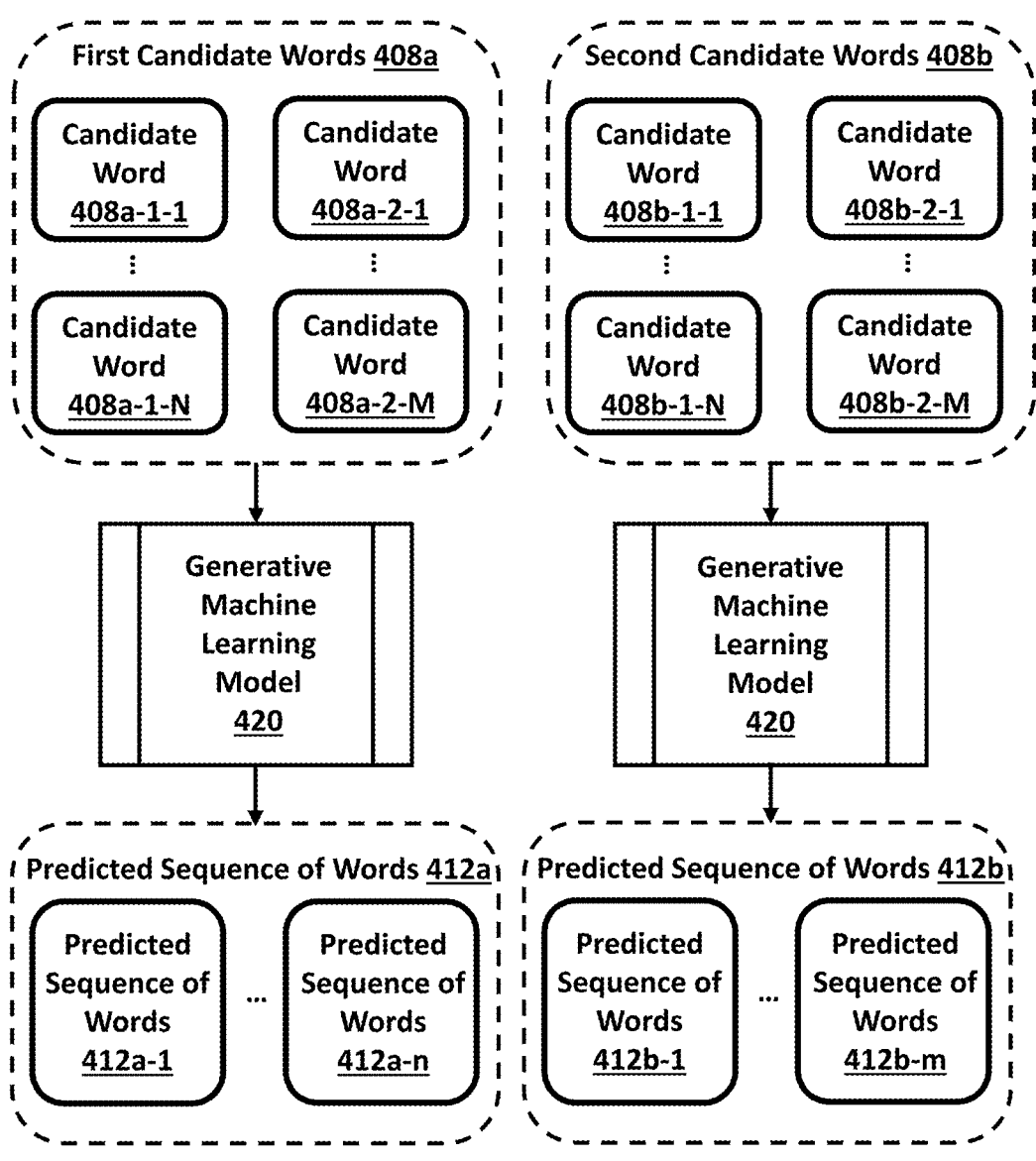

Returning to FIG. 1, computing system 102 may include data merging subsystem 114 configured to generate predicted sequences of words for different data sets labeled with different variables. As an example, with reference to FIGS. 4A-4B, system 114 may be configured to receive first data 402*a* labeled with a first variable 404*a* and second data 402*b* labeled with a second variable 404*b*. In one or more examples, first variable 404*a* may represent a first sequence of words. In one or more examples, second variable 404*b* may represent a second sequence of words. For example, as seen with reference to FIG. 5A, first data set 500 may include first data and second data set 510 may include second data. The first data within first data set 500 may include three columns of data, each labeled with a variable: "Person_ID," "FAM_SIZE," and "AGE." The second data included within second data set 510 may include five columns: "State_ID," "POP_0_4," "POP_5_9," "FAM_2PERS," and "FAM_3PERS." While the actual variables may not be the same, the underlying data represented by those variables may be the same or similar. For example, the variable "Person_ID" within first data set 500 may represent different users for which family size and family age are derived, while the variable "State_ID" within second data set 510 may represent similar user information.

Returning to FIG. 4A, in some embodiments, data merging subsystem 114 may be configured to determine whether first variable 404*a* comprises a first set of components 406*a*. For example, data merging subsystem 114 may determine whether first variable 404*a* includes any delimiters. If so, data merging subsystem 114 may separate first variable 404*a* into first set of components 406*a*. Each of components 406*a*-1 to 406*a*-2 (collectively first set of components 406*a*) may represent one of separated components of first variable 404*a*. In some embodiments, data merging subsystem 114 may be configured to determine whether second variable 404*b* comprises a second set of components 406*b*. For example, data merging subsystem 114 may determine whether second variable 404*b* includes any delimiters. If so, data merging subsystem 114 may separate second variable 404*b* into second set of components 406*b*. Each of components 406*b*-1 to 406*b*-2 (collectively second set of components 406*b*) may represent one of separated components of second variable 404*b*.

Determining first set of components 406*a* and second set of components 406*b* from first variable 404*a* and second variable 404*b*, respectively, may correspond to data merging subsystem 114 analyzing first variable 404*a* and second variable 404*b* using one or more rules stored in rules database 154. For example, one of the rules used to analyze first variable 404*a* and second variable 404*b* may be determining whether the first variable and/or the second variable include any delimiters, as mentioned above. A delimiter refers to a sequence of one or more characters specifying a boundary between separate, independent regions in plain text. Some example delimiters include the following characters: ";", ",", "_", "|", and the like. In some cases, the delimiters included in first variable 404*a* may differ from the delimiters included in second variable 404*b*. Furthermore, in some examples, first variable 404*a* and/or second variable 404*b* may not include any delimiters.

Some other rules stored in rules database 154 may include:

i) Numeric characters are to be treated as separate components. For example, the variable "3PERS" may be mapped to two components: "3" and "Persons."

ii) Some components may not be abbreviated. For example, the component "LANDSQMILE" may map to the phrase "Land Area in Square Miles."

iii) Variables can be expanded into meaningful phrases/ sequences of words. For example, the variable "NFH_3PERS" may be mapped to the sequence of words "Non-Family Household with 3 Persons.

iv) Most expanded sequences of words consist of nouns.

Some other rules stored in rules database 154 may include common abbreviation/acronym rules. For example, commonly used abbreviations (e.g., the word "population" having an abbreviation "POP," the word "average" having an abbreviation "AVG," etc.) may be determined or learned and stored in training data database 142 and/or word database 148. As another example, abbreviations comprising a beginning n characters of a word (e.g., the word "vacant" having the abbreviation "VAC," etc.) may be determined or learned and stored in training data database 142 and/or word database 148. As yet another example, an acronym may be formed by selecting a first character of a word within a sequence of words (e.g., the sequence of words "Household Income" may have the acronym "HI," the sequence of words "Non-Family Household" may have the acronym "NFH, etc.). As yet another example, an abbreviation may be formed by omitting vowels from a word (e.g., the word "service" may have the vowelless abbreviation "SRVC").

Figure 5B:
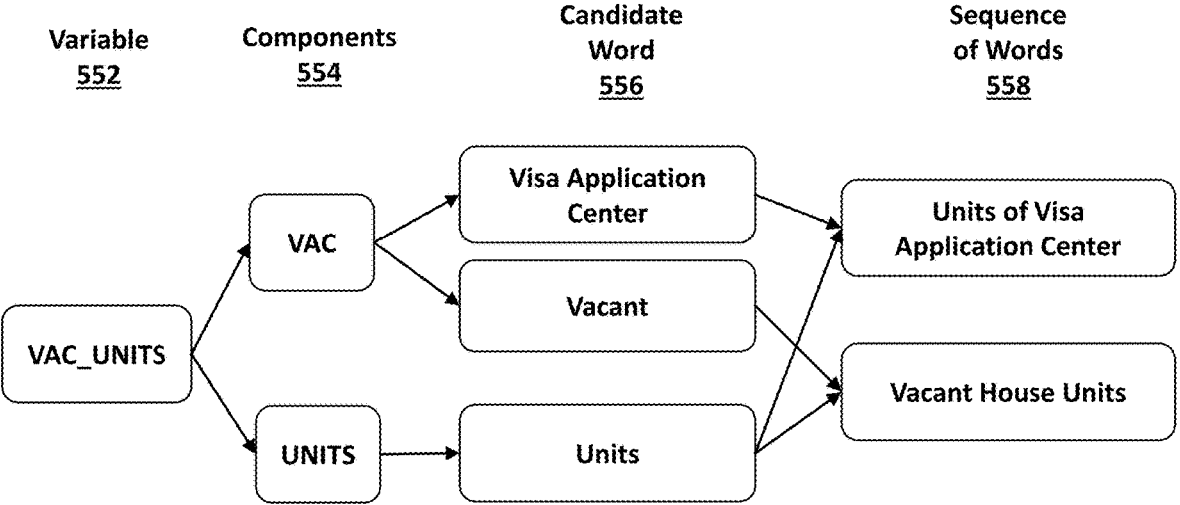

In some embodiments, data merging subsystem 114 may be configured to generate, using one or more machine learning models, one or more first candidate words represented by each of the first set of components. For example, first set of components 406*a* may be input to machine learning model 410 to obtain first candidate words 408*a*. First candidate words may include candidate words 408*a*-1-1 thru 408*a*-1-N (collectively "candidate words 408*a*-1") and candidate words 408*a*-2-1 thru 408*a*-2-M (collectively candidate words 408*a*-2). Each of candidate words 408*a*-1 and 408*a*-2 may represent a candidate word representing component 406*a*-1 of first set of components 406*a*. The number of different candidate words may depend on the number of components included in the set of components. For example, if first set of components 406*a* includes 2 components (e.g., components 406*a*-1, 406*a*-2) then machine learning model 410 may output one or more candidate words 408*a*-1 representing the first component (e.g., 406*a*-1) and one or more candidate words represents the second component (e.g., 406*a*-2). For example, with reference to FIG. 5B, variable 552 may be "VAC_UNITS," which can be split into components 554: a first component "VAC" and a second component "UNITS." The first component and the second component may then be expended from their abbreviation to candidate words 556, if applicable. In the example of FIG. 5B, machine learning model 410 may identify candidate words 556 representing the first component "VAC." For example, the candidate word "Vacant" may be an expansions of the component "VAC." In some embodiments, machine learning model 410 may access mapping table 282 of FIG. 2D to determine whether a given component corresponds to an acronym having any known mappings. For example, mapping table 282 may indicate that first component "VAC," as an acronym may represent the sequence of words "Visa Application Center."

A similar process may be performed for second data 402*b* labeled using second variable 404*b*. In some embodiments, data merging subsystem 114 may be configured to generate second set of components 406*b* based on second variable 404*b*. Second set of components 406*b* may include one or more components 406*b*-1 thru 406*b*-2. These components may be detected based on one or more rules, stored in rules database 154 being applied by data merging subsystem 114 to second variable 404*b*. In some embodiments, second set of components 406*b* may be input to machine learning model 410 to obtain second candidate words 408*b*. Similar to first candidate words 408*a*, second candidate words 408*b* may include one or more candidate words predicted for each component of second set of components 406*b*. For example, if second set of components 406*b* includes 2 components (e.g., components 406*b*-1, 406*b*-2) then machine learning model 410 may output one or more candidate words 408*b*-1-1 thru 408*b*-1-N (collectively "candidate words 408*b*-1") representing the first component (e.g., 406*b*-1) and one or more candidate words 408*b*-2-1 thru 408*b*-2-M (collectively "candidate words 408*b*-2") representing the second component (e.g., 406*a*-2).

In some embodiments, data merging subsystem 114 may be configured to generate, using a generative machine learning model, a first predicted sequence of words based on the one or more first candidate words. In some embodiments, data merging subsystem 114 may be configured to generate, using the generative machine learning model, a second predicted sequence of words based on the one or more second candidate words. As an example, with reference to FIG. 4B, first candidate words 408*a* may be input to a generative machine learning model 420 to obtain one or more predicted sequences of words 412*a*. Predicted sequences of words 412*a*-1 thru 412*a*-*n* (collectively "predicted sequences of words 412*a*") may represent meaningful phrases including a candidate word associated with each of first set of components 406*a*. Continuing the previous example, if first set of components 406*a* includes two components, one or more candidate words may be generated for both components. Generative machine learning model 420 may generate various combinations of the various candidate words, using one candidate word from the candidate words associated with each component, preserving the order of the components with the sequence of words. In one or more examples, for each component of the first set of components, one or more first sequences of candidate words may be generated using the generative machine learning model based on the identified first candidate words representing that component.

In some embodiments, a similar process may be performed for second candidate words 408b representing candidate words for each of second set of components 406b, determined from second variable 404b. For example, second candidate words 408b may be input to generative machine learning model 420 to obtain predicted sequence of words 412b-1 thru 412b-m (collectively 412b).

Returning again to FIG. 5B, the variable "VAC_UNITS" may be split into a first component "VAC" and a second component "UNITS." First component "VAC" may yield candidate words "Visa Application Center" and "Vacant," while second component "UNITS" may represent the candidate word "Units." Predicted sequences of words 558 may be generated based on candidate words 556. Each sequence of words 558 may include combinations of candidate words 556. For example, a predicted sequence of words may be "Units of Visa Application Center," formed by combining the candidate word "Units" for the second component "UNITS" with the candidate words "Visa Application Center" for the first component "VAC." As another example, a predicted sequence of words may be "Vacant House Units," formed by combining the candidate word "Vacant" for first component "VAC" with candidate word "Units" for second component "UNITS."

FIG. 6A illustrates an example of a process 600 for generating a merging instruction 612 based on predicted sequences of words, in accordance with various embodiments. In some examples, data merging subsystem 114 may be configured to select a predicted sequence of words from first predicted sequence of words 412a and a predicted sequence of words from second predicted sequence of words 412b. In one or more examples, the first predicted sequence of words may be selected from the one or more first sequences of candidate words (e.g., one of predicted sequences of words 412a-1 thru 412a-n) based on a first frequency with which each of the one or more first sequences of candidate words occurs within a sentence table. For example, sentence table 272 of FIG. 2D may be stored in training data database 142, domain specific content database 146, word database 148, and/or phrase database 152. In some examples, the first predicted sequence of words may be selected based on the first frequency with which each of the first sequences of candidate words occurs within the sentence table. Alternatively, a first selection of the first predicted sequence of words from the one or more first sequences of candidate words may be received. For example, the first selection may be detected based on an input from user device 130 (as described with respect to FIG. 1). In one or more examples, the second predicted sequence of words may be selected from the one or more second sequences of candidate words (e.g., one of predicted sequences of words 412b-1 thru 412b-m) based on a second frequency with which each of the one or more second sequences of candidate words occurs within the sentence table. In some examples, the second predicted sequence of words may be selected based on the second frequency with which each of the second sequences of candidate words occurs within the sentence table. Alternatively, a second selection of the second predicted sequence of words from the one or more second sequences of candidate words may be received. For example, the second selection may be detected based on an input from user device 130 (as described with respect to FIG. 1).

In some embodiments, the sentence table may store a plurality of sentences from one or more domain-specific corpuses, such as domain specific content database 146. The sentences stored within domain-specific corpuses may, in some cases, be sorted based on a frequency with which each of the sentences occurs within the domain-specific corpuses.

In some embodiments, data merging subsystem 114 may be configured to compute a similarity metric 610 based on the predicted first sequence of words selected from predicted sequences of words 412a and the second predicted sequence of words selected from predicted sequences of words 412b. In some embodiments, similarity metric 610 may be determined by calculating a Euclidean distance, a Jaccard Distance, a Cosine similarity, a Hamming Distance, a Levenshtein Edit distance, or other functions, between the selected first predicted sequence of words and the selected second predicted sequence of words. In one or more examples, each predicted sequence of words may be vectorized to generate a representation of the sequence of words in order to calculate similarity metric 610. In some embodiments, embeddings representing each selected predicted sequence of words may be generated using an encoder, and a distance between the embeddings in an embedding space may be used to calculate similarity metric 610.

In some embodiments, data merging subsystem 114 may be configured to generate, based on the similarity metric and a merging condition, a merging instruction 612. In some examples, generating merging instruction 612 may include data merging subsystem 114 being configured to determine whether similarity metric 610 satisfies the merging condition. In one or more examples, the merging condition being satisfied comprises similarity metric 610 being greater than or equal to a threshold similarity score. In one or more examples, the merging condition failing to be satisfied comprises similarity metric 610 being less than the threshold similarity score. The threshold similarity score may be a value indicative of how similar the selected first predicted sequence of words is to the selected second predicted sequence of words. This similarity may relate to how similar the actual words are between the first and second predicted sequences of words, how similar the context of the first predicted sequence of words is to the context of the second predicted sequence of words, how similar an intent of the first predicted sequence of words is to an intent of the second predicted sequence of words, or other similarities between the first and second predicted sequence of words.

Figure 6B:
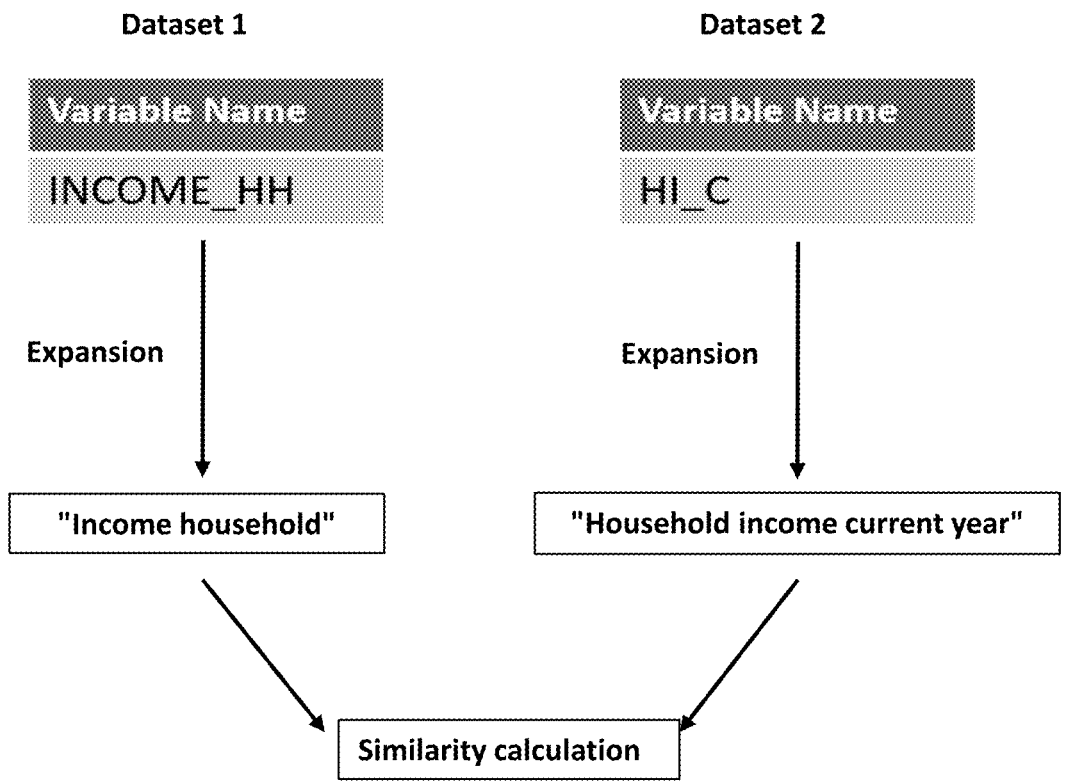

As an illustrative example, with reference to FIG. 6B, data set 1 may include first data labeled with a first variable "INCOME_HH" and data set 2 may include second data labeled with a second variable "HI_C." In order to determine whether the first data can be merged with the second data, the first variable and the second variable may be expanded into respective sequences of words, as described herein. For example, the first variable "INCOME_HH" may be expanded to the sequence of words "Income household," and the second variable "HI_C" may be expanded to the sequence of words "Household income current year." The similarity metric may compare the contextual meaning of both expanded variables, instead of the comparing the similarity of the actual variable. For example, similarity metric 610 may calculate how similar an embedding representing the sequence of words "Income household" is to an embedding representing the sequence of words "Household income current year."

Returning to FIG. 6A, merging instruction 612 may be an instruction indicating whether to merge at least a portion of first data 402a and at least a portion of second data 402b. For example, merging instruction 612 may be an instruction to merge at least a portion of first data 402*a* with at least a portion of second data 402*b* based on similarity metric 610 satisfying the merging condition. For example, merged data 620 may comprise first data 402*a* and second data 402*b*. Alternatively, if data merging subsystem 114 determines that similarity metric 610 fails to satisfy the merging condition, merging instruction 612 may be an instruction to prevent some or all of first data 402*a* and second data 402*b* from being merged.

In some embodiments, the mapping table may be updated based on the results of data merging subsystem 114. For example, if similarity metric 610 is determined to satisfy the merging condition, data merging subsystem 114 may be configured to determine whether mapping table 282 lacks an abbreviation-to-word mapping of one or more first components (e.g., first set of components 406*a*) of first variable 404*a* and/or one or more second components (e.g., second set of components 406*b*) of second variable 404*b* to a corresponding word. If so, data merging subsystem 114 may be configured to update the mapping table to include the abbreviation-to-word mapping. Similarity, an acronym to sequence of words mapping identified by data merging subsystem 114 may be added to mapping table 282 if data merging subsystem 114 determines that the mapping is absent from mapping table 282.

Example Flowcharts

FIG. 7 illustrates a flowchart of an example method 700 for generating a merging instruction indicating whether to merge different data sets or portions thereof, in accordance with various embodiments. In certain embodiments, method 700 may be executed utilizing one or more processing devices (e.g., computing system 102 that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), a deep learning processor (DLP), a tensor processing unit (TPU), a neuromorphic processing unit (NPU), or any other processing device(s)), software (e.g., instructions running/executing on one or more processors), firmware (e.g., microcode), or some combination thereof). In some embodiments, each step of method 700 may be performed by a subsystem that is the same or similar to data merging subsystem 114.

In some embodiments, method 700 may begin at step 702. At step 702, first data labeled with a first variable and second data labeled with a second variable may be received. The first variable may represent a first sequence of words and the second variable may represent a second sequence of words. For example, the first data may be labeled with the variable "INCOME_HH," and the second data may be labeled with the variable "HI_C." Each may have an underlying meaning described by a sequence of words. For example, "INCOME_HH" may mean "Household Income," and "HI_C" may mean "Household Income for the Current year." Thus, in the example, the first variable and the second variable represent phrases having a same or similar meaning, even though the first variable and the second variable differ.

At step 704, a determination may be made that the first variable comprises a first set of components and that the second variable comprises a second set of components. In some embodiments, one or more rules may be applied to the first variable and the second variable to detect components. For example, one rule may detect delimiters within the first variable and the second variable. Considering the example mentioned in step 702, the variable "INCOME_HH" includes the delimiter "_". Thus, the variable can be split into a first component "INCOME" and a second component "HH."

At step 706, one or more first candidate words represented by each of the first set of components and one or more second candidate words represented by each of the second set of components may be generated using one or more machine learning models. For example, the variable "VAC_UNITS" may include components "VAC" and "UNITS." One or more candidate words may be determined for the component "VAC" and one or more candidate words may also be determined for component "UNITS." In some embodiments, the candidate words may be determined using first machine learning model 310.

At step 708, a first predicted sequence of words may be generated using a generative machine learning model based on the first candidate words and a second predicted sequence of words may be generated using the generative machine learning model based on the second candidate words. The sequence of words may represent a meaningful phrase describing the type of data being analyzed for possible merging. In some embodiments, generative machine learning model 420 may be used to generate the predicted sequences of words.

At step 710, a similarity metric may be computed based on the predicted first sequence of words and the second predicted sequence of words. The similarity metric may measure how similar the underlying contextual meaning of the predicted first sequence of words is to the underlying contextual meaning of the predicted second sequence of words. For example, the similarity metric may indicate how similar the sequence of words "Income household" is to the sequence of words "Household income current year," which respectively correspond to expansions of data labeled with variables "INCOME_HH" and "HI_C."

At step 712, a merging instruction may be generated based on the similarity metric and a merging condition. In some embodiments, generating the merging instruction comprises determining that the similarity metric satisfies the merging condition. In this example, the merging instruction may be an instruction to merge at least a portion of the first data and at least a portion of the second data. In one or more examples, the merging condition being satisfied comprises the similarity metric being greater than or equal to a threshold similarity score. In some embodiments, generating the merging instruction comprises determining that the similarity metric fails to satisfy the merging condition. In this example, the merging instruction may be an instruction to prevent the first data and the second data from being merged.

Figure 8:
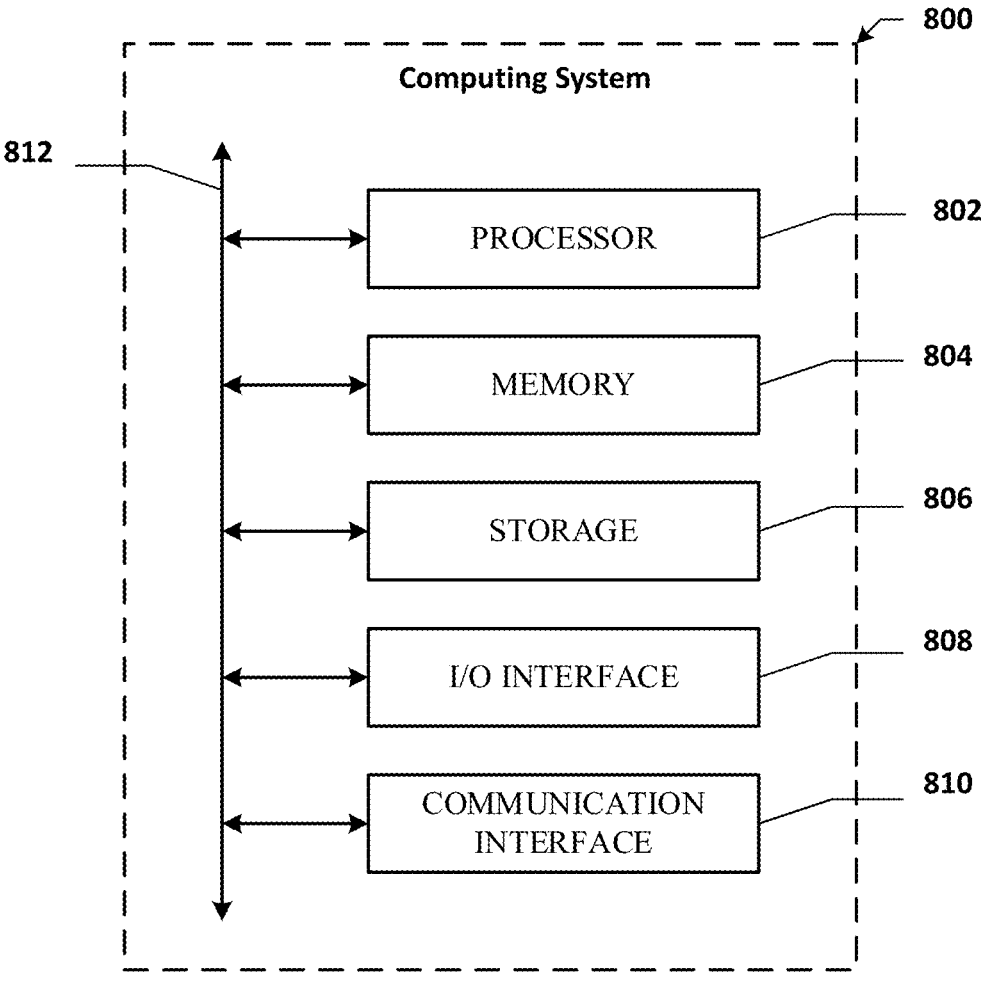
FIG. 8 illustrates an example computer system used to implement some or all of the techniques described herein.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for generating a merging instruction indicating whether to merge different data sets or portions thereof, comprising:

receiving first data labeled with a first variable and second data labeled with a second variable, wherein the first variable represents a first sequence of words and the second variable represents a second sequence of words;

identifying one or more first components of the first variable and one or more second components of the second variable;

for each of the one or more first components:

generating, using one or more machine learning models, one or more first candidate words;

for each of the one or more second components:

generating, using the one or more machine learning models, one or more second candidate words;

generating, using a generative machine learning model, a first prediction of the first sequence of words based on the one or more first candidate words and a second prediction of the second sequence of words based on the one or more second candidate words;

computing a similarity metric based on the first prediction and the second prediction; and generating, based on the similarity metric and a merging condition, a merging instruction indicating whether the first data and the second data are to be merged.

2. The method of claim 1, wherein generating the merging instruction comprises:

determining that the similarity metric satisfies the merging condition, wherein the merging instruction comprises an instruction to merge at least a portion of the first data and at least a portion of the second data.

3. The method of claim 1, wherein generating the merging instruction comprises:

determining that the similarity metric fails to satisfy the merging condition, wherein the merging instruction comprises an instruction to prevent the first data and the second data from being merged.

4. The method of claim 1, wherein the merging condition being satisfied comprises the similarity metric being greater than or equal to a threshold similarity score.

5. The method of claim 1, further comprising:

detecting one or more delimiters within at least one of the first variable or the second variable, wherein the one or more first components of the first variable and the one or more second components of the second variable are identified based on the one or more detected delimiters.

6. The method of claim 1, further comprising:

generating, using the generative machine learning model, one or more first sequences of candidate words based on the one or more first candidate words, wherein the first prediction of the first sequence of words is selected from the one or more first sequences of candidate words;

generating, using the generative machine learning model, one or more second sequences of candidate words based on the one or more second candidate words, wherein the second prediction of the second sequence of words is selected from the one or more second sequences of candidate words.

7. The method of claim 6, wherein generating the first prediction of the first sequence of words and the second prediction of the second sequence of words:

for each of the one or more first sequences of candidate words:

determining a first frequency with which the first sequence of candidate words occurs within a sentence table, wherein the first prediction of the first sequence of words is selected from the one or more first sequences of candidate words based on the first frequency; and for each of the one or more second sequences of candidate words:

determining a second frequency with which the second sequence of candidate words occurs within the sentence table, wherein the second prediction of the second sequence of words is selected from the one or more second sequences of candidate words based on the second frequency.

8. The method of claim 7, wherein the sentence table stores a plurality of sentences from one or more domain-specific corpuses sorted based on a frequency with which each of the plurality of sentences occurs within the one or more domain-specific corpuses, wherein each of the plurality of sentences comprises a sequence of words.

9. The method of claim 6, further comprising:

receiving a first selection of the first prediction of the first sequence of words from the one or more first sequences of candidate words; and receiving a second selection of the second prediction of the second sequence of words from the one or more second sequences of candidate words.

10. The method of claim 1, wherein the one or more machine learning models comprise:

a first machine learning model trained to predict a word based on an n-gram of the word;

a second machine learning model trained to predict a word based on a vowelless abbreviation of the word; and a third machine learning model trained to predict a sequence of words based on an acronym representing the sequence of words.

11. The method of claim 10, further comprising:

training the first machine learning model by:

selecting a plurality of words from a corpus;

for each of the plurality of words:

generating an n-gram of the word;

inputting the n-gram into the first machine learning model to obtain a prediction of the word;

computing a loss function based on a difference between the word and the prediction of the word; and adjusting one or more parameters of the first machine learning model based on the computed loss function.

12. The method of claim 11, wherein a size of the n-gram selected for each word of the plurality of words is based on a number of characters in the word.

13. The method of claim 12, wherein the n-gram is:

a bi-gram for words having 3 characters;

a 3-gram for words having 4 or more characters; or a 4-gram for words having 5 or more characters.

14. The method of claim 10, further comprising:

training the second machine learning model by:

selecting a plurality of words from a corpus;

for each of the plurality of words:

generating a vowelless abbreviation of the word;

inputting the vowelless abbreviation of the word into the second machine learning model to obtain a prediction of the word;

computing a loss function based on a difference between the word and the prediction of the word; and adjusting one or more parameters of the second machine learning model based on the computed loss function.

15. The method of claim 10, further comprising:

training the third machine learning model by:

selecting a plurality of sequences of words from a corpus;

for each of the plurality of sequences of words:

generating or obtaining an acronym representing the sequence of words;

inputting the acronym into the third machine learning model to obtain a prediction of the sequence of words;

computing a loss function based on a difference between the sequence of words and the prediction of the sequence of words; and adjusting one or more parameters of the third machine learning model based on the computed loss function.

16. The method of claim 1, further comprising:

generating a word table comprising a predefined listing of nouns and a plurality of domain specific words;

generating a sentence table comprising a plurality of sentences from one or more domain-specific corpuses; and generating a mapping table comprising at least one of: (i) n-gram word mappings between words and n-grams of those words, (ii) vowelless abbreviation-word mappings between words and vowelless abbreviations of those words, or (iii) acronym-sequence mappings between sequences of words and acronyms representing those sequences of words.

17. The method of claim 16, further comprising:

updating, based on the similarity metric satisfying the merging condition, the mapping table to include at least one of a new n-gram-word mapping, a new vowelless abbreviation-word mapping, or a new acronym-sequence mapping.

18. The method of claim 1, further comprising:

training the generative machine learning model by:

receiving a plurality of sets of words and a corresponding sequence of words formed from each set of words of the plurality of sets of words; and for each of the plurality of sets of words:

inputting the set of words to the generative machine learning model to obtain a prediction of the corresponding sequence of words;

computing a loss function based on the corresponding sequence of words and the prediction of the corresponding sequence of words; and adjusting one or more parameters of the generative machine learning model based on the loss function.

19. A system for generating a merging instruction indicating whether to merge different data sets or portions thereof comprising one or more processors and a memory, the memory storing one or more computer instructions which when executed by the one or more processors, cause the system to:

receive first data labeled with a first variable and second data labeled with a second variable, wherein the first variable represents a first sequence of words and the second variable represents a second sequence of words;

identify one or more first components of the first variable and one or more second components of the second variable;

for each of the one or more first components:

generate, using one or more machine learning models, one or more first candidate words;

for each of the one or more second components:

generate, using the one or more machine learning models, one or more second candidate words;

generate, using a generative machine learning model, a first prediction of the first sequence of words based on the one or more first candidate words and a second prediction of the second sequence of words based on the one or more second candidate words;

compute a similarity metric based on the first prediction and the second prediction; and generate, based on the similarity metric and a merging condition, a merging instruction indicating whether the first data and the second data are to be merged.

20. A non-transitory computer readable storage medium storing instructions for generating a merging instruction indicating whether to merge different data sets or portions thereof, wherein the instructions are executable by a system comprising one or more processors to cause the system to:

receive first data labeled with a first variable and second data labeled with a second variable, wherein the first variable represents a first sequence of words and the second variable represents a second sequence of words;

identify one or more first components of the first variable and one or more second components of the second variable;

for each of the one or more first components:

generate, using one or more machine learning models, one or more first candidate words;

for each of the one or more second components:

generate, using the one or more machine learning models, one or more second candidate words;

generate, using a generative machine learning model, a first prediction of the first sequence of words based on the one or more first candidate words and a second prediction of the second sequence of words based on the one or more second candidate words;

compute a similarity metric based on the first prediction and the second prediction; and generate, based on the similarity metric and a merging condition, a merging instruction indicating whether the first data and the second data are to be merged.

* * * * *